US007591428B2

(12) United States Patent
Freeman et al.

(10) Patent No.: US 7,591,428 B2
(45) Date of Patent: Sep. 22, 2009

(54) MAGNETIC DETECTION SYSTEM FOR USE IN CURRENCY PROCESSING AND METHOD AND APPARATUS FOR USING THE SAME

(75) Inventors: Jay D. Freeman, Encinitas, CA (US); Tomasz Marek Jagielinski, Carlsbad, CA (US)

(73) Assignee: Cummins-Allison Corp., Mt. Prospect, IL (US)

( * ) Notice: Subject to any disclaimer, the term of this patent is extended or adjusted under 35 U.S.C. 154(b) by 467 days.

(21) Appl. No.: 11/238,217

(22) Filed: Sep. 29, 2005

(65) Prior Publication Data

US 2006/0078186 A1 Apr. 13, 2006

Related U.S. Application Data

(60) Provisional application No. 60/614,630, filed on Sep. 30, 2004.

(51) Int. Cl.
*G06K 7/08* (2006.01)

(52) U.S. Cl. ....................... 235/449; 235/379; 235/450; 382/135; 382/136; 382/137; 382/138; 382/139

(58) Field of Classification Search ................. 235/379, 235/449, 450; 382/135–139
See application file for complete search history.

(56) References Cited

U.S. PATENT DOCUMENTS 4,038,596 A * 7/1977 Lee ............................ 324/235
4,356,473 A 10/1982 Freudenthal ............. 340/146.3
4,593,184 A 6/1986 Bryce et al. ................. 235/449
5,068,519 A * 11/1991 Bryce ......................... 235/449
5,163,672 A 11/1992 Mennie ....................... 271/187
5,207,788 A 5/1993 Geib .......................... 271/122
5,295,196 A 3/1994 Raterman et al. .............. 382/7
5,418,458 A * 5/1995 Jeffers ........................ 324/235
5,467,405 A 11/1995 Raterman et al. ........... 382/135
5,467,406 A 11/1995 Graves et al. ............... 382/135
D369,984 S 5/1996 Larsen ........................ D10/97

(Continued)

FOREIGN PATENT DOCUMENTS

WO WO 91/11778 8/1991

(Continued)

OTHER PUBLICATIONS

Search Report for PCT/US05/035091 [WO 2006/039439] which claims priority to U.S. Appl. No. 60/614,630 (Aug. 11, 2006).

(Continued)

*Primary Examiner*—Thien M. Le
*Assistant Examiner*—Tuyen K Vo
(74) *Attorney, Agent, or Firm*—Nixon Peabody LLP

(57) ABSTRACT

A magnetic detection system for authenticating a document includes a first magnetic scanhead adapted to create a first magnetic field for saturating the magnetization of an area on each of the bills. The magnetic detection system further includes a second magnetic scanhead with an electromagnet. The electromagnet is capable of creating a second magnetic field of adjustable intensity. The second magnetic field is the opposite polarity of the first magnetic field. The intensity of the second magnetic field is adjusted by changing the amount of current supplied to the electromagnet. The amount of current supplied to the electromagnet is based upon a characteristic of the document to be authenticated.

39 Claims, 9 Drawing Sheets

U.S. PATENT DOCUMENTS

| | | | | |
|---|---|---|---|---|
| 5,552,589 | A * | 9/1996 | Smith et al. | 235/449 |
| 5,633,949 | A | 5/1997 | Graves et al. | 382/135 |
| 5,640,463 | A | 6/1997 | Csulits | 382/135 |
| 5,644,228 | A * | 7/1997 | Jeffers et al. | 324/235 |
| 5,652,802 | A | 7/1997 | Graves et al. | 382/135 |
| 5,687,963 | A | 11/1997 | Mennie | 271/119 |
| 5,692,067 | A | 11/1997 | Raterman et al. | 382/135 |
| 5,704,491 | A | 1/1998 | Graves | 209/534 |
| 5,724,438 | A | 3/1998 | Graves | 382/135 |
| 5,751,840 | A | 5/1998 | Raterman et al. | 382/135 |
| 5,790,693 | A | 8/1998 | Graves et al. | 382/135 |
| 5,790,697 | A | 8/1998 | Jones et al. | 382/135 |
| 5,806,650 | A | 9/1998 | Mennie et al. | 194/206 |
| 5,815,592 | A | 9/1998 | Mennie et al. | 382/135 |
| 5,822,448 | A | 10/1998 | Graves et al. | 382/135 |
| 5,832,104 | A | 11/1998 | Graves et al. | 382/135 |
| 5,867,589 | A | 2/1999 | Graves et al. | 382/135 |
| 5,870,487 | A | 2/1999 | Graves et al. | 382/135 |
| 5,875,259 | A | 2/1999 | Mennie et al. | 382/135 |
| 5,905,810 | A | 5/1999 | Jones et al. | 382/135 |
| 5,909,502 | A | 6/1999 | Mazur | 382/135 |
| 5,909,503 | A | 6/1999 | Graves et al. | 382/135 |
| 5,912,982 | A | 6/1999 | Munro et al. | 382/135 |
| 5,938,044 | A | 8/1999 | Weggesser | 209/534 |
| 5,940,623 | A | 8/1999 | Watts et al. | 395/712 |
| 5,943,655 | A | 8/1999 | Jacobsen | 705/30 |
| 5,960,103 | A | 9/1999 | Graves et al. | 382/135 |
| 5,966,456 | A | 10/1999 | Jones et al. | 382/135 |
| 5,982,918 | A | 11/1999 | Mennie et al. | 382/135 |
| 5,992,601 | A | 11/1999 | Mennie et al. | 194/207 |
| 6,012,565 | A | 1/2000 | Mazur | 194/207 |
| 6,021,883 | A | 2/2000 | Casanova et al. | 194/217 |
| 6,026,175 | A | 2/2000 | Raterman et al. | 382/135 |
| 6,028,951 | A | 2/2000 | Raterman et al. | 382/135 |
| 6,039,645 | A | 3/2000 | Mazur | 453/10 |
| 6,068,194 | A | 5/2000 | Mazur | 235/492 |
| 6,072,896 | A | 6/2000 | Graves et al. | 382/135 |
| 6,073,744 | A | 6/2000 | Raterman et al. | 194/207 |
| 6,074,334 | A | 6/2000 | Mennie et al. | 493/438 |
| 6,128,402 | A | 10/2000 | Jones et al. | 382/135 |
| 6,141,161 | A * | 10/2000 | Sato et al. | 360/2 |
| 6,220,419 | B1 | 4/2001 | Mennie | 194/207 |
| 6,237,739 | B1 | 5/2001 | Mazur et al. | 194/207 |
| 6,241,069 | B1 | 6/2001 | Mazur et al. | 194/207 |
| 6,256,407 | B1 | 7/2001 | Mennie et al. | 382/135 |
| 6,278,795 | B1 | 8/2001 | Anderson et al. | 382/135 |
| 6,311,819 | B1 | 11/2001 | Stromme et al. | 194/207 |
| 6,318,537 | B1 | 11/2001 | Jones et al. | 194/346 |
| 6,351,551 | B1 | 2/2002 | Munro et al. | 382/135 |
| 6,363,164 | B1 | 3/2002 | Jones et al. | 382/135 |
| 6,371,303 | B1 | 4/2002 | Klein et al. | 209/534 |
| 6,378,683 | B2 | 4/2002 | Mennie | 194/207 |
| 6,381,354 | B1 | 4/2002 | Mennie et al. | 382/135 |
| 6,398,000 | B1 | 6/2002 | Jenrick et al. | 194/200 |
| 6,459,806 | B1 | 10/2002 | Raterman et al. | 382/135 |
| 6,460,705 | B1 | 10/2002 | Hallowell | 209/534 |
| 6,493,461 | B1 | 12/2002 | Mennie et al. | 382/135 |
| 6,539,104 | B1 | 3/2003 | Raterman et al. | 382/135 |
| 6,560,355 | B2 | 5/2003 | Graves et al. | 382/135 |
| 6,588,569 | B1 | 7/2003 | Jenrick et al. | 194/206 |
| 6,601,687 | B1 | 8/2003 | Jenrick et al. | 194/206 |
| 6,603,872 | B2 | 8/2003 | Jones et al. | 382/135 |
| 6,621,919 | B2 | 9/2003 | Mennie et al. | 382/135 |
| 6,628,816 | B2 | 9/2003 | Mennie et al. | 382/135 |
| 6,636,624 | B2 | 10/2003 | Raterman et al. | 382/135 |
| 6,647,136 | B2 | 11/2003 | Jones et al. | 382/137 |
| 6,650,767 | B2 | 11/2003 | Jones et al. | 382/135 |
| 6,654,486 | B2 | 11/2003 | Jones et al. | 382/135 |
| 6,661,910 | B2 | 12/2003 | Jones et al. | 382/135 |
| 6,665,431 | B2 | 12/2003 | Jones et al. | 382/135 |
| 6,678,401 | B2 | 1/2004 | Jones et al. | 382/135 |
| 6,678,402 | B2 | 1/2004 | Jones et al. | 382/135 |
| 6,705,470 | B2 | 3/2004 | Klein et al. | 209/534 |
| 6,721,442 | B1 | 4/2004 | Mennie et al. | 382/135 |
| 6,724,926 | B2 | 4/2004 | Jones et al. | 382/135 |
| 6,724,927 | B2 | 4/2004 | Jones et al. | 382/135 |
| 6,731,785 | B1 | 5/2004 | Mennie et al. | 382/135 |
| 6,731,786 | B2 | 5/2004 | Jones et al. | 382/135 |
| 6,748,101 | B1 | 6/2004 | Jones et al. | 382/135 |
| 6,778,693 | B2 | 8/2004 | Jones et al. | 382/136 |
| 6,798,899 | B2 | 9/2004 | Mennie et al. | 271/10.09 |
| 6,810,137 | B2 | 10/2004 | Jones et al. | 382/137 |
| 6,843,418 | B2 | 1/2005 | Jones et al. | 235/462.01 |
| 6,860,375 | B2 | 3/2005 | Hallowell et al. | 194/328 |
| 6,866,134 | B2 | 3/2005 | Stromme et al. | 194/207 |
| 6,868,954 | B2 | 3/2005 | Stromme et al. | 194/207 |
| 6,880,692 | B1 | 4/2005 | Mazur et al. | 194/207 |
| 6,913,130 | B1 | 7/2005 | Mazur et al. | 194/207 |
| 6,913,260 | B2 | 7/2005 | Maier et al. | 271/265.04 |
| 6,915,893 | B2 | 7/2005 | Mennie | 271/265.04 |
| 6,929,109 | B1 | 8/2005 | Klein et al. | 194/206 |
| 6,955,253 | B1 | 10/2005 | Mazur et al. | 194/207 |
| 6,959,800 | B1 | 11/2005 | Mazur et al. | 194/207 |
| 6,980,684 | B1 | 12/2005 | Munro et al. | 382/135 |
| 6,994,200 | B2 | 2/2006 | Jenrick et al. | 194/206 |
| 6,996,263 | B2 | 2/2006 | Jones et al. | 382/135 |
| 7,000,828 | B2 | 2/2006 | Jones | 235/379 |
| 7,016,767 | B2 | 3/2006 | Jones et al. | 700/224 |
| 2001/0006557 | A1 | 7/2001 | Mennie et al. | 382/135 |
| 2001/0015311 | A1 | 8/2001 | Mennie | 194/207 |
| 2001/0019624 | A1 | 9/2001 | Raterman et al. | 382/135 |
| 2001/0035603 | A1 | 11/2001 | Graves et al. | 271/265.01 |
| 2002/0001393 | A1 | 1/2002 | Jones et al. | 382/135 |
| 2002/0020603 | A1 | 2/2002 | Jones et al. | 194/346 |
| 2002/0056605 | A1 | 5/2002 | Mazur et al. | 194/207 |
| 2002/0085245 | A1 | 7/2002 | Mennie et al. | 382/135 |
| 2002/0085745 | A1 | 7/2002 | Jones et al. | 382/135 |
| 2002/0103757 | A1 | 8/2002 | Jones et al. | 382/135 |
| 2002/0104785 | A1 | 8/2002 | Klein et al. | 209/534 |
| 2002/0107801 | A1 | 8/2002 | Jones et al. | 382/137 |
| 2002/0118871 | A1 | 8/2002 | Jones et al. | 382/135 |
| 2002/0122580 | A1 | 9/2002 | Jones et al. | 382/135 |
| 2002/0126885 | A1 | 9/2002 | Mennie et al. | 382/135 |
| 2002/0126886 | A1 | 9/2002 | Jones et al. | 382/135 |
| 2002/0131630 | A1 | 9/2002 | Jones et al. | 382/135 |
| 2002/0136442 | A1 | 9/2002 | Jones et al. | 382/135 |
| 2002/0145035 | A1 | 10/2002 | Jones | 235/379 |
| 2002/0154804 | A1 | 10/2002 | Jones et al. | 382/135 |
| 2002/0154805 | A1 | 10/2002 | Jones et al. | 382/135 |
| 2002/0154806 | A1 | 10/2002 | Jones et al. | 382/135 |
| 2002/0154807 | A1 | 10/2002 | Jones et al. | 382/135 |
| 2002/0154808 | A1 | 10/2002 | Jones et al. | 382/135 |
| 2002/0186876 | A1 | 12/2002 | Jones et al. | 382/135 |
| 2003/0009420 | A1 | 1/2003 | Jones | 705/39 |
| 2003/0015395 | A1 | 1/2003 | Hallowell et al. | 194/206 |
| 2003/0015396 | A1 | 1/2003 | Mennie | 194/206 |
| 2003/0059098 | A1 | 3/2003 | Jones et al. | 382/135 |
| 2003/0062242 | A1 | 4/2003 | Hallowell et al. | 194/302 |
| 2003/0081824 | A1 | 5/2003 | Mennie et al. | 382/135 |
| 2003/0108233 | A1 | 6/2003 | Raterman et al. | 382/135 |
| 2003/0121752 | A1 | 7/2003 | Stromme et al. | 194/207 |
| 2003/0121753 | A1 | 7/2003 | Stromme et al. | 194/207 |
| 2003/0132281 | A1 | 7/2003 | Jones et al. | 235/379 |
| 2003/0139994 | A1 | 7/2003 | Jones | 705/36 |
| 2003/0168308 | A1 | 9/2003 | Maier et al. | 194/207 |
| 2003/0174874 | A1 | 9/2003 | Raterman et al. | 382/135 |
| 2003/0182217 | A1 | 9/2003 | Chiles | 705/35 |
| 2003/0198373 | A1 | 10/2003 | Raterman et al. | 382/135 |
| 2003/0202690 | A1 | 10/2003 | Jones et al. | 382/139 |
| 2003/0211883 | A1 | 11/2003 | Potts | 463/25 |
| 2004/0003980 | A1 | 1/2004 | Hallowell et al. | 194/206 |
| 2004/0016621 | A1 | 1/2004 | Jenrick et al. | 194/206 |
| 2004/0016797 | A1 | 1/2004 | Jones et al. | 235/462.01 |
| 2004/0028266 | A1 | 2/2004 | Jones et al. | 382/135 |

| | | | | |
|---|---|---|---|---|
| 2004/0083149 | A1 | 4/2004 | Jones | 705/35 |
| 2004/0145726 | A1 | 7/2004 | Csulits et al. | 356/71 |
| 2004/0149538 | A1 | 8/2004 | Sakowski | 194/207 |
| 2004/0153408 | A1 | 8/2004 | Jones et al. | 705/43 |
| 2004/0154964 | A1 | 8/2004 | Jones | 209/534 |
| 2004/0251110 | A1 | 12/2004 | Jenrick et al. | |
| 2005/0029168 | A1 | 2/2005 | Jones et al. | 209/534 |
| 2005/0035034 | A1 | 2/2005 | Long | |
| 2005/0040225 | A1 | 2/2005 | Csulits et al. | 235/379 |
| 2005/0047642 | A1 | 3/2005 | Jones et al. | |
| 2005/0060055 | A1 | 3/2005 | Hallowell | 700/213 |
| 2005/0060059 | A1 | 3/2005 | Klein et al. | 700/213 |
| 2005/0060061 | A1 | 3/2005 | Jones | 700/213 |
| 2005/0077142 | A1 | 4/2005 | Tam et al. | 194/217 |
| 2005/0086271 | A1 | 4/2005 | Jones et al. | 707/200 |
| 2005/0087422 | A1 | 4/2005 | Maier et al. | 194/207 |
| 2005/0117791 | A2 | 6/2005 | Raterman et al. | 382/135 |
| 2005/0117792 | A2 | 6/2005 | Raterman et al. | 382/135 |
| 2005/0150738 | A1 | 7/2005 | Jones et al. | 382/135 |
| 2005/0163361 | A1 | 7/2005 | Jones et al. | 382/135 |
| 2005/0163362 | A1 | 7/2005 | Jones et al. | 382/137 |
| 2005/0169511 | A1 | 8/2005 | Jones | 382/135 |
| 2005/0173221 | A1 | 8/2005 | Maier et al. | 194/207 |
| 2005/0183928 | A1 | 8/2005 | Jones et al. | 194/207 |
| 2005/0207634 | A1 | 9/2005 | Jones et al. | 382/135 |
| 2005/0213803 | A1 | 9/2005 | Mennie et al. | 382/135 |
| 2005/0241909 | A1 | 11/2005 | Mazur et al. | 194/207 |
| 2005/0249394 | A1 | 11/2005 | Jones et al. | 382/135 |
| 2005/0265591 | A1 | 12/2005 | Jones et al. | 382/135 |
| 2005/0276458 | A1 | 12/2005 | Jones et al. | 382/135 |
| 2005/0278239 | A1 | 12/2005 | Jones et al. | 705/35 |
| 2006/0010071 | A1 | 1/2006 | Jones et al. | 705/42 |
| 2006/0054455 | A1 | 3/2006 | Kuykendall et al. | 194/217 |
| 2006/0065717 | A1 | 3/2006 | Hurwitz et al. | 235/381 |
| 2006/0073883 | A1 | 4/2006 | Franks | 463/25 |

FOREIGN PATENT DOCUMENTS

| | | | |
|---|---|---|---|
| WO | WO 92/17394 | | 10/1992 |
| WO | WO 93/23824 | | 11/1993 |
| WO | WO 95/24691 | | 9/1995 |
| WO | WO 96/10800 | | 4/1996 |
| WO | WO 96/36933 | | 11/1996 |
| WO | WO 97/30422 | | 8/1997 |
| WO | WO 97/43734 | | 11/1997 |
| WO | WO 97/45810 | | 12/1997 |
| WO | WO 98/12662 | | 3/1998 |
| WO | WO 98/13785 | | 4/1998 |
| WO | WO 98/24052 | | 6/1998 |
| WO | WO 98/24067 | | 6/1998 |
| WO | WO 98/35323 | | 8/1998 |
| WO | WO 98/40839 | | 9/1998 |
| WO | WO 98/47100 | | 10/1998 |
| WO | WO 98/50892 | | 11/1998 |
| WO | WO 98/59323 | | 12/1998 |
| WO | WO 99/09511 | | 2/1999 |
| WO | WO 99/14668 | | 3/1999 |
| WO | WO 99/23601 | | 5/1999 |
| WO | WO 99/41695 | | 8/1999 |
| WO | WO 99/48040 | | 9/1999 |
| WO | WO 99/48042 | | 9/1999 |
| WO | WO 00/24572 | | 5/2000 |
| WO | WO 01/08108 | | 2/2001 |
| WO | WO 01/59685 | | 8/2001 |
| WO | WO 01/59723 | | 8/2001 |
| WO | WO 02/29735 | | 4/2002 |
| WO | WO 02/054360 | | 7/2002 |
| WO | WO 03/005312 | | 1/2003 |
| WO | WO 03/028361 | | 4/2003 |
| WO | WO 03/029913 | | 4/2003 |
| WO | WO 03/030113 | | 4/2003 |
| WO | WO 03/067532 | | 8/2003 |
| WO | WO 03/017282 | | 12/2003 |
| WO | WO 2004/010367 | | 1/2004 |
| WO | WO 2004/027717 | | 4/2004 |
| WO | WO 2004/036508 | | 4/2004 |
| WO | WO 2004/038631 | | 5/2004 |
| WO | WO 2004/068422 | | 8/2004 |
| WO | WO 2005/013209 | A2 | 2/2005 |
| WO | WO 2005/017842 | A1 | 2/2005 |
| WO | WO 2005/029240 | A2 | 3/2005 |
| WO | WO 2005/036445 | A1 | 4/2005 |
| WO | WO 2004/041134 | A2 | 5/2005 |
| WO | WO 2005/076229 | A1 | 8/2005 |

OTHER PUBLICATIONS

Written Opinion fot PCT/US05/035091 [WO 2006/039439] which claims priority to U.S. Appl. No. 60/614,630 (Aug. 11, 2006).

Int'l Preliminary Report on Patentability for PCT/US05/035091 [WO 2006/039439] which claims priority to U.S. Appl. No. 60/614,630 (Apr. 12, 2007).

NTS Technology Corp., Gaming and casino solutions (1 page) (printed Apr. 24, 2006).

NTS Technology Corp., Gaming and casino solutions Quick Jack specifications (2 pages) (printed Apr. 24, 2006).

NTS Technology Corp., Gaming and casino solutions: Quick Jack Plus (1 page) (printed Apr. 24, 2006).

* cited by examiner

MAGNETIC DETECTION SYSTEM FOR USE IN CURRENCY PROCESSING AND METHOD AND APPARATUS FOR USING THE SAME

CROSS-REFERENCE TO RELATED APPLICATION

This application claims priority to U.S. provisional application Ser. No. 60/614,630, filed on Sep. 30, 2004. The disclosure of the aforementioned provisional application is incorporated by reference in its entirety herein

FIELD OF THE INVENTION

The present invention relates generally to the field of currency processing systems and, more particularly, to a magnetic detection system for use in the processing of currency bills having magnetic attributes.

BACKGROUND OF THE INVENTION

Typical bill authentication devices which utilize the magnetic hysteresis properties of the material of a secured document—such as currency—employ at least one static magnetic field. Other bill authentication devices employ two static magnetic fields of the same or opposite polarities. The use of two magnetic fields allows for a measure of both the saturation magnetization and the non-saturated magnetization. Where fields of opposite polarities are employed, the choice of the reverse polarity field is such that not only the magnitude of the output is changed, but the polarity (phase) is also changed. In typical bill authentication devices, permanent magnets are used to create one or two static magnetic fields.

SUMMARY OF THE INVENTION

According to one embodiment of the present invention, a currency processing device having an input receptacle adapted to receive a stack of bills to be processed and a transport mechanism adapted to transport bills, one at a time, from the input receptacle along a transport path to at least one output receptacle is disclosed. The device comprises a denominating sensor disposed along the transport path adapted to obtain denominating information from each of the bills. The device further comprises a memory adapted to store master denominating information and master authentication information. The device further comprises a first magnetic scanhead disposed along the transport path downstream from the denominating sensor, the first magnetic scanhead being adapted to create a first magnetic field for saturating the magnetization of an area on each of the bills. The device further comprises a second magnetic scanhead disposed along the transport path downstream from the first magnetic scanhead, the second magnetic scanhead being adapted to create a second magnetic field of variable intensity, the second magnetic field being of opposite polarity from the first magnetic field. The device further comprises a controller being adapted to receive the denominating information from the denominating sensor, the controller being adapted to determine the denomination of each of the bills when the obtained denominating information favorably compares to the stored master denominating information, the controller being adapted to adjust the second magnetic field intensity based on the determined denomination of each of the bills.

According to another embodiment of the present invention, a currency processing device having an input receptacle adapted to receive a stack of bills to be processed and a transport mechanism adapted to transport bills, one at a time, from the input receptacle along a transport path to at least one output receptacle is disclosed. The currency processing device comprises a denomination determining unit. The currency processing device further comprises a first magnetic scanhead disposed along the transport path, the first magnetic scanhead being adapted to create a first magnetic field for saturating the magnetization of an area on each of the bills, the first magnetic scanhead including a first sensor for measuring the flux of each of the bills in response to the first magnetic field. The currency processing device further comprises a second magnetic scanhead disposed along the transport path downstream from the first magnetic scanhead, the second magnetic scanhead being adapted to create a second magnetic field of variable intensity, the second magnetic field being of opposite polarity from the first magnetic field, the second magnetic scanhead including a second sensor for measuring the flux of each of the bills in response to the second magnetic field, the second magnetic scanhead being adjustable to vary the intensity of the magnetic field. The currency processing device further comprises a memory adapted to store master field strength information and master authentication information. The currency processing device further comprises a controller being adapted to determine the required field strength of the second magnetic field by comparing the determined denomination to the master field strength information, the controller being adapted to adjust the second magnetic field intensity based on the required field strength determination, the controller is adapted to determine a flux ratio of the first magnetic flux measurement to the second magnetic flux measurement, the controller being adapted to compare the determined flux ratio for each bill to the stored master authentication information.

According to another embodiment of the present invention, a method for determining the authenticity of currency bills with a currency processing device, the currency processing device adapted to determine the denomination of each of the currency bills is disclosed. The method comprises transporting each of the currency bills past a first magnetic scanhead and a second magnetic scanhead located downstream from the first magnetic scanhead, the first magnetic scanhead including a first sensor, and the second magnetic scanhead including a second sensor. The method further comprises creating a first magnetic field for saturating the magnetization of an area on each of the bills. The method further comprises measuring with the first sensor the magnetic flux of the area on each of the bills in response to the first magnetic field. The method further comprises adjusting the intensity of the second magnetic field based on the denomination of each of the currency bills, the second magnetic field being of opposite polarity from the first magnetic field. The method further comprises measuring with the second sensor the magnetic flux of the area on each of the bills in response to the second magnetic field. The method further comprises determining a flux ratio of the first magnetic flux measurement to the second magnetic flux measurement.

According to another embodiment of the present invention, a currency processing device having an input receptacle adapted to receive a stack of bills to be processed and a transport mechanism adapted to transport bills, one at a time, from the input receptacle along a transport path to at least one output receptacle is disclosed. The currency processing device comprises a denominating sensor disposed along the transport path adapted to obtain denominating information from each of the bills. The currency processing device comprises a memory adapted to store master denominating information and master authentication information. The currency processing device comprises a first array comprising a plurality of magnetic scanheads, the first array being disposed along the transport path downstream from the denominating sensor, the plurality of scanheads being adapted to create at least one first magnetic field for saturating the magnetization of an area on each of the bills. The currency processing device comprises a second array comprising a plurality of magnetic scanheads, the second array being disposed along the transport path downstream from the first magnetic scanhead, the plurality of magnetic scanheads being adapted to create at least one second magnetic field of variable intensity, the at least one second magnetic field being of opposite polarity from the at least one first magnetic field. The currency processing device comprises a controller being adapted to receive the denominating characteristic information from the denominating sensor, the controller being adapted to determine the denomination of each of the bills when the obtained denominating characteristic information favorably compares to the stored master denominating characteristic information, the controller being adapted to adjust the second magnetic field intensity in each of the magnetic scanhead contained in a second array of magnetic scanheads based on the determined denomination of each of the bills and location of the magnetic area in the bill.

According to another embodiment of the present invention, a magnetic detection system for authenticating a document is disclosed. The magnetic detection system comprises a first magnetic scanhead being adapted to create a first magnetic field for saturating the magnetization of an area of a document. The magnetic detection system further comprises a second magnetic scanhead including an electromagnet, the electromagnet being capable of creating a second magnetic field of adjustable intensity, the second magnetic field being of opposite polarity from the first magnetic field. The intensity of the second magnetic field is adjusted by changing the amount of current supplied to the electromagnet. The amount of current supplied to the electromagnet is based upon a characteristic of the document to be authenticated.

According to another embodiment of the present invention, a magnetic scanhead for sensing a flux measurement of a document being transported past the scanhead is disclosed. The magnetic scanhead comprises a first pole piece perpendicular to the transport direction. The magnetic scanhead further comprises a second pole piece perpendicular to the transport direction and parallel to the first pole piece. The magnetic scanhead further comprises a middle section located between the first pole piece and the second pole piece. The magnetic scanhead further comprises a coil having a conductive core and an insulating material, the coil being twisted around at least a portion of the first pole piece, the coil having a plurality of ends. The magnetic scanhead further comprises at least one power supply wherein the plurality of ends of the coil are electrically connected to the power supply, the power supply being adapted to supply an adjustable and reversible D.C. electric current to the coil. The magnetic scanhead further comprises a sensor between the first pole piece and the second pole piece, the sensor being adapted to sense the flux measurement of the document being transported.

The above summary of the present invention is not intended to represent each embodiment, or every aspect, of the present invention. Additional features and benefits of the present invention are apparent from the detailed description, figures, and embodiments set forth below.

Figure 1:
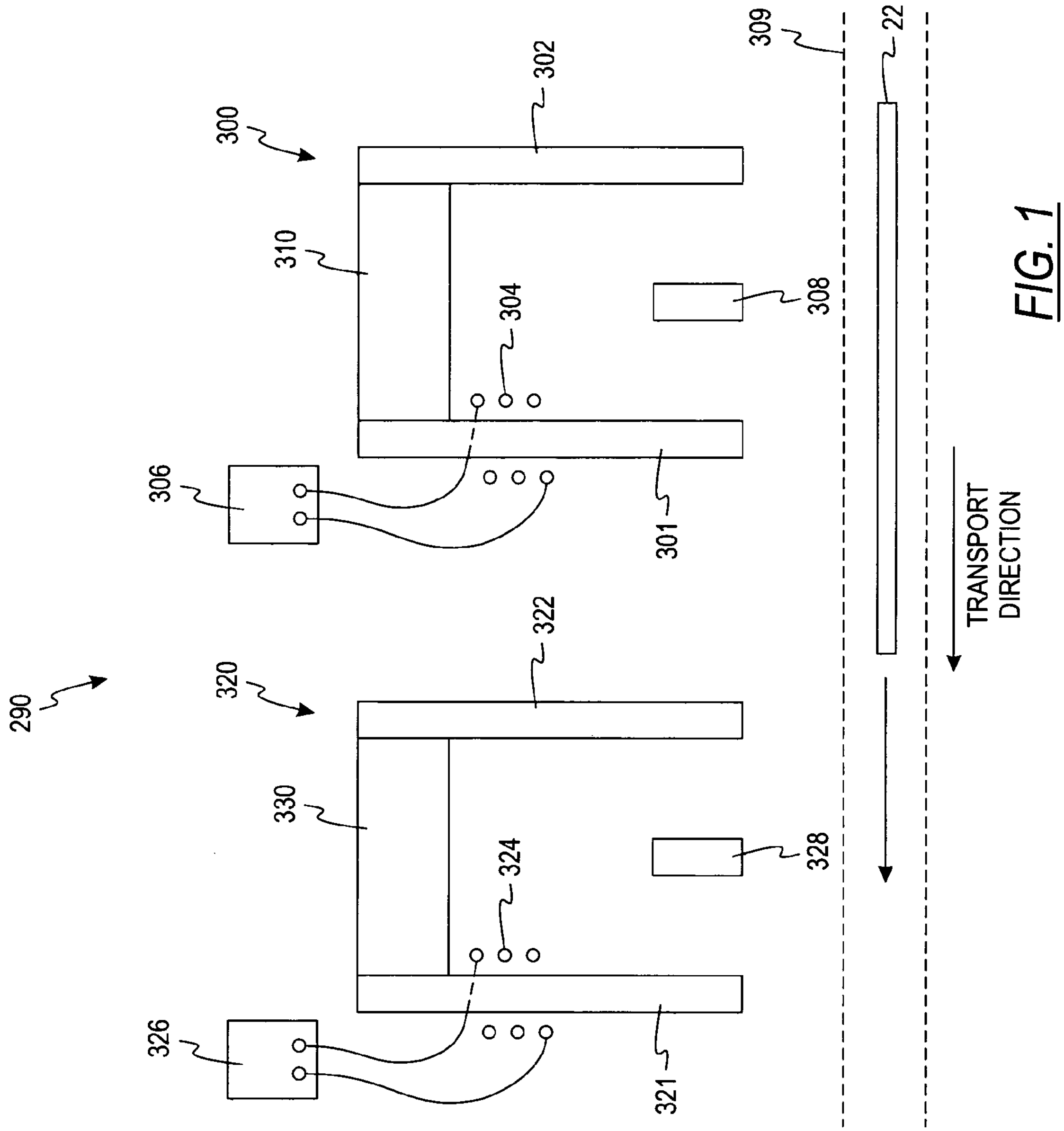
FIG. 1 is a functional block diagram of a pair of magnetic sensors, according to one embodiment of the present invention.

While the invention is susceptible to various modifications and alternative forms, specific embodiments are shown by way of example in the drawings and are described in detail herein. It should be understood, however, that the invention is not intended to be limited to the particular forms disclosed. Rather, the invention is to cover all modifications, equivalents, and alternatives falling within the spirit and scope of the invention defined by the appended claims.

DETAILED DESCRIPTION OF THE ILLUSTRATED EMBODIMENTS

To measure currencies containing different magnetic materials, the field requirements may be different, and preferably, variable. To test currencies containing different magnetic materials, the permanent magnets must be changed to create the required fields.

According to various embodiments of the present invention, a variable intensity magnetic scanhead (e.g., an electromagnetic scanhead), a magnetic detection system for authenticating documents—such as currency bills—incorporating the variable intensity magnetic scanhead, a currency processing device incorporating the magnetic detection system, and a method for using the magnetic detection system are disclosed. Generally, in one embodiment of the present invention a denominating sensor is used to identify the denomination of a currency bill and a magnetic scanhead is used to determine the authenticity of the currency bill based on its identified denomination. And generally, in another embodiment, the denomination of a currency bill is manually input by an operator of the device and a magnetic scanhead is used to determine the authenticity of the currency bill.

Turning now to the drawings, and initially to FIG. 1, a magnetic detection system 290 having multiple magnetic scanheads 300 and 320, is illustrated according to one embodiment of the present invention A document—for example, a currency bill 22—may be moved in the transport direction past the scan heads 300 and 320. As the bill 22 traverses the magnetic scanheads 300 and 320, the sensors effectively determine the magnetic properties across a dimension of the bill 22.

The magnetic scanhead 300 includes a first pole piece 301, a second pole piece 302, and a middle section 310 located between the pole pieces 301, 302. The pole pieces 301, 302 are positioned perpendicularly to the transport direction, which is depicted by the arrow in FIG. 1. In one embodiment, the first pole piece 301 is constructed of a soft magnetic material, such as cold-rolled steel. And in one embodiment, the second pole piece is constructed of a soft magnetic material, such as cold-rolled steel. In some embodiments, the pole pieces 301, 302 are elongated and have a generally-regular cross-section (e.g., generally round, rectangular, polygonal). A coil 304, having a conductive core and an insulating material, is twisted around a portion of the first pole piece 301 in multiple revolutions. The ends of the coil 304 are electrically connected to a power supply 306 capable of sending an adjustable and reversible D.C. electric current through the coil 304. In this embodiment, the magnetic scanhead 300 forms an electromagnet where at least a portion of the created magnetic field is produced by running current through the coil 304.

In another embodiment, the first pole piece 301 is constructed of a permanent magnetic material. In some embodiments, the second pole piece is constructed of cold rolled steel, permalloy, or mumetal. In another embodiment, a second coil may be wrapped around the second pole piece 302. This second coil may be connected to the power supply 306 or a separate power supply may be connected to the second coil.

The coil 304 may have as many revolutions around the first pole piece 301 as required to create the necessary field. According to one embodiment of the present invention, a coil 304 has about 1000 to about 8000 turns around the first pole piece 301. As is readily apparent to those of ordinary skill in the art, the greater the number of turns in the coil 304, the greater the magnetic field produced by a constant current. This value is referred to as the amp-turns, which is the applied current (in amps) multiplied by the number of turns in the winding. The magnetic scanhead 300 may be designed to utilize a wide range of D.C. current power supplies.

In one embodiment of the present invention, a scanhead is provided with between about 0.0 amp-turns to about 0.1 amp-turns. In another embodiment, a scanhead is provided with between about 0.1 and about 2 amp-turns. In another embodiment, a scanhead is provided with greater than about 2 amp-turns until the magnetic saturation point of the pole piece (a function of the design and materials of the pole piece) is reached. The number of amp-turns required varies directly with the type and denomination of currency to be processed. Thus, the larger the required field, the greater the amp-turns that should be provided to the scanheads.

Figure 5:
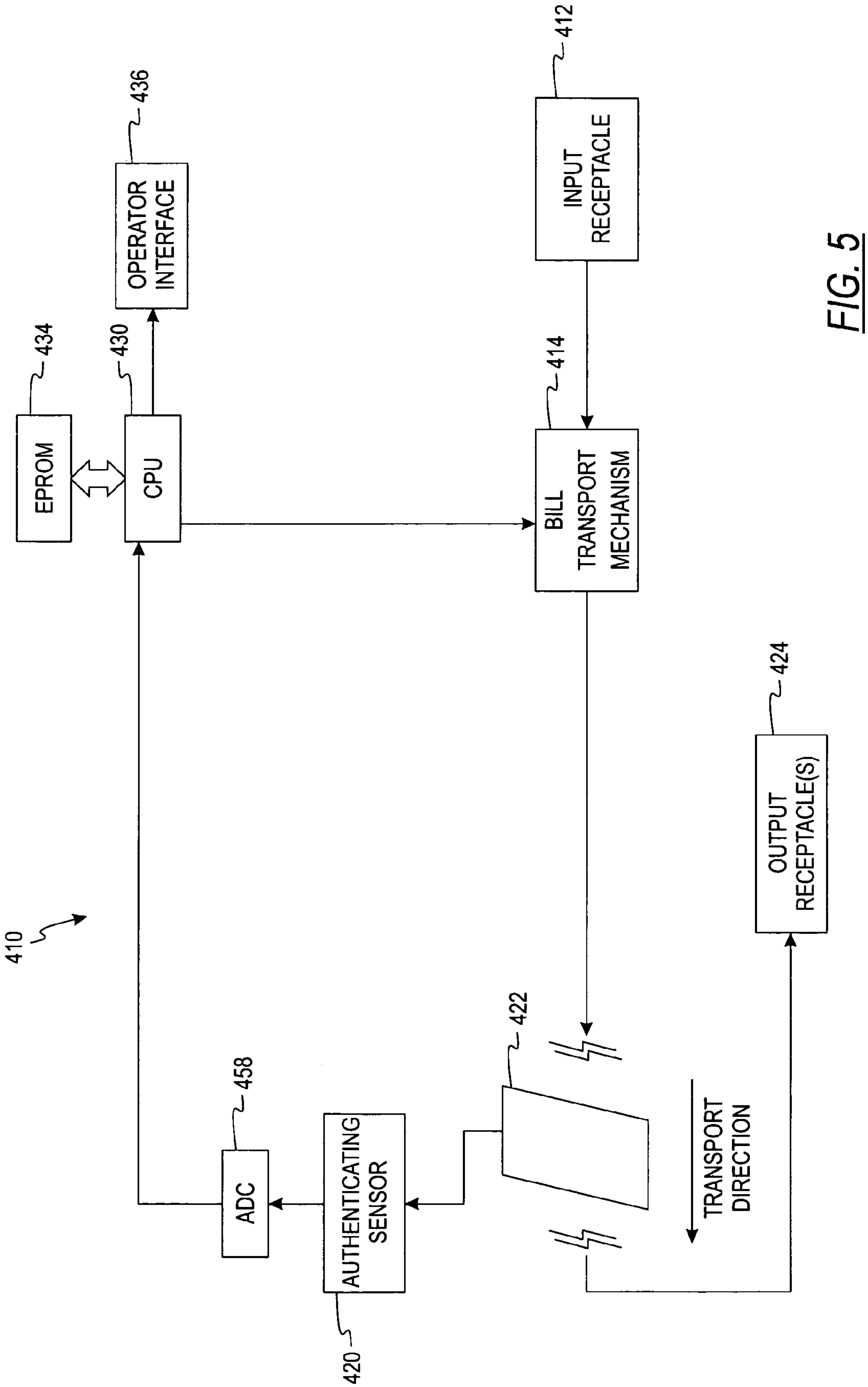
FIG. 5 is a functional block diagram of a currency processing system according to one embodiment of the present invention.

Depending on the particular application, the coil may have numerous turns so as to reduce the D.C. current required to produce the field which, in turn, reduces the noise and heat created in producing the magnetic field. For example, it may be desirable to reduce the heat, circuitry, size, and radiated E-M noise, when the scanhead is incorpoarted into a currency processing system 10 (FIG. 3) or a currency processing system 400 (FIG. 5).

According to one embodiment of the present invention, the coil 304 is wrapped around both the first pole piece 301 and the second pole piece 302. According to yet another embodiment, a second coil is wrapped around the second pole piece 302 and both the coil 304 and the second coil produce the desired magnetic field.

The magnetic scanhead 300 includes a magnetic sensor 308 that is positioned adjacent the bill transport path 309 (shown by a pair of dashed lines in FIG. 1) for detecting the magnetic field of a passing currency bill 22. As the bill 22 travels past the magnetic sensor 308, the sensor 308 detects the presence of magnetic material. The magnetic sensor 308 samples a plurality of flux measurements from the passing bill 22 along a path parallel to the scan direction. A variety of currency characteristics can be measured using magnetic sensors including, for example, changing patterns in the magnetic flux of a bill, (U.S. Pat. No. 3,280,974), patterns of vertical grid lines in the portrait area of bills, (U.S. Pat. No. 3,870,629), the presence of a security thread (U.S. Pat. No. 5,151,607), total amount of magnetizable material of a bill (U.S. Pat. No. 4,617,458), patterns from sensing the strength of magnetic fields along a bill (U.S. Pat. No. 4,593,184), and other patterns and counts from scanning different portions of the bill such as the area in which the denomination is written out (U.S. Pat. No. 4,356,473). The U.S. Patents describing the detection of the above-recited magnetic attributes of currency bills are parenthetically mentioned after the items, each of these patent numbers is incorporated herein by reference in its entirety.

In one embodiment, the magnetic sensor 308 is an unshielded magnetoresistive sensor used to measure the flux of the moving bill 22. Examples of magnetoresistive sensors are described in, for example, U.S. Pat. Nos. 5,119,025; 4,683,508; 4,413,296; 4,388,662; and 4,164,770. In another embodiment, a standard audio head is used.

In the illustrated embodiment, the middle section 310 of the magnetic scanhead 300 is a permanent magnet. The permanent magnet may be constructed of any hard magnetic material, e.g., AlNiCo 5, 7 or 9(alnico), SmCo (samarium cobalt), NdFeB (Neodynium Iron Boron), etc. The permanent magnet may be used to reduce the amount of current required by the coil 304 to create the overall magnetic field. For example, a magnetic field of at least about ±100 Oe is provided for the evaluation of most currency bills, according to one embodiment of the present invention. In this embodiment, a permanent magnet of about ±100 Oe is incorporated into the magnetic scanhead 300 and the coil 304 would then adjust this constant field according to the particular requirements for the passing bill 22 as is described below. Alternatively, in other embodiments, the middle section 310 is not a magnet and the coil 304 creates the entire field required to authenticate the passing bill 22 as described below.

The second scanhead 320, is similar to the first scanhead 300, and comprises a first pole piece 321, a second pole piece 322, a middle section 330 (or spacer bar) located between the pole pieces 321, 322 opposite the transport path, and a coil 324 winding around the first pole piece 321, according to one embodiment. The power supply 326 supplies a sufficient current to the coil 324 to create a magnetic field in a second direction, which is opposite in polarity from the field created by the first scanhead 300. The second scanhead 320 further comprises a sensor 328 used to measure the flux of the bill 22 after being magnetized by the second magnetic field. According to one embodiment of the present invention, the coil 324 is wrapped around both the first pole piece 321 and the second pole piece 322. According to yet another embodiment, a second coil is wrapped around the second pole piece 322 and both the coil 324 and the second coil produce the desired magnetic field.

As shown in FIG. 1, the bill 22 moving in the indicated scan or transport direction first approaches the first magnetic scanhead 300 which incorporates a permanent magnet as the middle section 310, according to one embodiment. The first magnetic scanhead 300 is used to saturate the magnetization of the bill 22 in a first direction. The saturation field is chosen so as to completely align the magnetic moment in the material in the exposed area of the bill 22 in a first direction. This field may be set based on the specific field required for each bill or may be preset to saturate every bill potentially requiring authentication.

The permanent magnet is included in the present embodiment to reduce the amount of current required to produce the desired magnetic field. A permanent magnet is also useful in embodiments where a preset saturation field is desired. In these embodiments, the permanent magnet should be of sufficient strength to saturate the field of any bill that would potentially be inserted into the system 10. Once the bill 22 has been exposed to the saturation field, the magnetic sensor 308 in the first scanhead 300 measures the flux of the continuously moving bill 22.

As discussed, the magnetic scanhead 300 should produce a magnetic field with a strength at the surface of the note that is larger than the field required to saturate the note's magnetic material. Generally, a saturation field strength of at least three times larger than the coercivity of the bill's magnetic material ensures that the note becomes saturated, though this field strength may be reduced or increased if desired. Thus, the saturation field can range in strength from about 0 Oe to in excess of about 3000 Oe depending on the magnetic properties of the bill to be authenticated. The reverse field can range in strength from about 0 Oe to in excess of about 3000 Oe as well. A scanhead according to the present invention can be designed to cover all or part of this range. According to one embodiment, a scanhead is provided that creates a field from about 0 Oe to in excess of about 3000 Oe. In another embodiment, a scanhead is provided that creates a field from about 0-10 Oe. In another embodiment, a scanhead creates a field from about 10-350 Oe. In another embodiment, a scanhead creates a field from about 350-3000 Oe. In another embodiment, a scanhead creates a field in excess of about 3000 Oe.

The transport mechanism continues to move the bill 22 past the first scanhead 300 to the second scanhead 320. As discussed earlier, during and/or possibly after exposure to the first magnetic scanhead 300, the currency bill 22 (specifically, the magnetic material exposed to the field) is fully saturated such that the magnetic materials in the bill 22 are completely aligned in a first direction. The magnetic field produced by the second scanhead 320 should be of sufficient strength to reverse the magnetization direction of the genuine bill 22 (e.g., align at least a majority of the magnetic material in a second direction, opposite the first direction). The second scanhead 320 creates a field at a predetermined percentage of the genuine bill's reverse saturation field (e.g., 25% saturation, 50% saturation, 60% saturation, 75% saturation, etc.). The field strength and percentage of the reverse saturation field are specific to the particular type and denomination of the bill 22.

In an alternative embodiment of the present invention, the middle section 330 of the second scanhead 320 is a permanent magnet. In this embodiment, the permanent magnet in the second scanhead 320 would create a constant magnetic field of opposite polarity from the field created in the first scanhead 300. In this embodiment, the coil 324 would be used to increase or decrease the field strength based upon the specific parameters required for the bill 22.

In yet another alternative embodiment of the present invention, the coil 304 is removed from the first scanhead 300 and only a permanent magnet is used to create the saturation field. In this embodiment, the permanent magnet would be chosen so as to saturate the magnetization of a bill regardless of the bill type or denomination. In yet another embodiment, the middle section 310 is a spacer bar (instead of a permanent magnet). In this embodiment, the coil 304 creates the entire magnetic field required to saturate the magnetization of the bill 22.

In another embodiment, a first array of scanheads 300 and a second array of scanheads 320 may be used. In such embodiments, the scanheads incorporated in the arrays take flux readings along multiple segments of the bill 22 parallel to the direction of transport of the bill 22. This is particularly useful where the bill 22 incorporates multiple magnetic materials or has multiple magnetic zones on the face of the currency bill. Where arrays are used, according to some such embodiments, the coils within each scanhead can adjust the generated electric fields independently of the other scanheads. Thus, the arrays allow different fields to be used at different lateral locations across the transport path to further authenticate a bill 22.

In another embodiment of the present invention, the arrays of scanheads are aligned with each other such that the area of the bill 22 which passes under a first scanhead of the first array, will subsequently pass under a first scanhead of the second array. Further, according to other embodiments, additional arrays can be added to the above magnetic detection system as desired.

Figure 2:
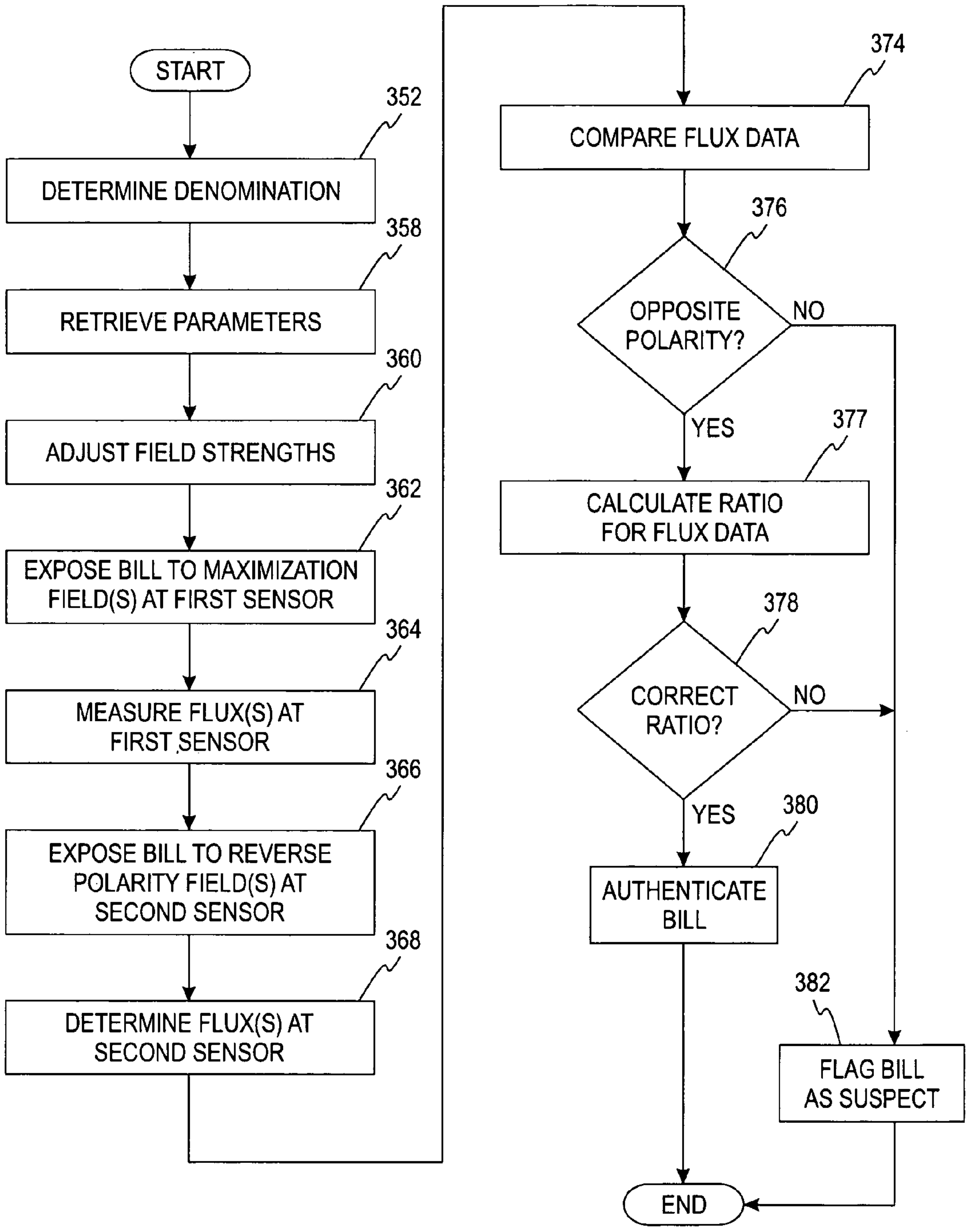
FIG. 2 is a flow chart describing the operation of a currency processing system according to one embodiment of the present invention.

Referring now to FIG. 2, a method 350 for authenticating currency bills with the magnetic detection system 290 having first and second magnetic scanheads 300, 320, such as shown in FIG. 1, will be described according to one embodiment of the present invention. A stack of currency bills to be processed is placed in the input receptacle 12 (FIG. 3) of a currency processing device which includes the magnetic detection system 290. The bills are transported from the input receptacle, one at a time, past two or more scanheads and before being delivered to the output receptacle(s) 24. Turning to FIG. 2, at step 352 the denomination of each currency bill is determined, for example, with data received from the one or more denominating sensors 17 (FIG. 3) or, alternatively, the denomination may be manually input. Once the bill's denomination is determined, the CPU 30 (FIG. 3) adjusts the field strength of the first and second magnetic scanheads 300, 320 based on each bill's determined denomination. The CPU 30 accesses the memory 34 that contains a database of the specific magnetic field parameters for each denomination of currency bill the system is designed to process. The CPU 30 accesses these parameters at step 358 and adjusts the field strengths of magnetic scanheads 300, 320 according to the specific parameters at step 360. The field strengths are timely adjusted such that the scanheads 300, 320 produce the appropriate field as each particular bill 22 moves past each magnetic scanhead 300, 320. In embodiments where arrays of scanheads are used, the strength of the field in each of the scanheads is adjusted based on the predetermined (expected) pattern of the bill 22. In other words, the field strength is adjusted depending on the location of the individual scanhead, to account for the different magnetic materials in different locations of the bill 22.

As the bill moves past the one or more authentication sensors 20 which includes the magnetic detection system 290, it is exposed to the saturation field, step 362, produced by the first magnetic scanhead 300. At step 364 the magnetic flux of the bill is measured by the magnetic sensor 308 as the bill 22 moves past the first magnetic scanhead 300 while the bill 22 is still exposed to the magnetic field. The sensor 308 outputs a signal indicative of the magnetic flux of the currency bill. Next, as the bill 22 continues to move along the bill transport path 309, the bill 22 moves past the second magnetic scanhead 320 (FIG. 1) where, at step 366, it is exposed to a second magnetic field of opposite polarity. The reverse polarity field has been previously set at step 360 according to the specific parameters of the bill at step 358 as described above. At step 368 the bill's 22 flux is measured by the sensor 328 of the second magnetic scanhead 300 which outputs a signal indicative of the flux to the CPU 30. The bill's 22 flux is measured while the bill 22 is exposed to the second magnetic field. The bill 22 continues to move along the transport path 309 toward the output receptacle(s).

Upon receiving the magnetic flux measurements from each of the sensors 308, 328 within the magnetic scanheads 300, 320, the CPU 30 evaluates the flux measurements at step 374. Initially, at step 376, the CPU 30 compares the flux measurement obtained at step 364 to the flux measurement obtained at step 368 to ensure that the obtained flux measurements are of opposite polarities. If the CPU 30 determines the polarities do not favorably compare (i.e., are not opposite), the bill is flagged as a suspect note and the CPU 30 generates an error signal at step 382. If, the polarities favorably compare (i.e., are opposite), the CPU 30 calculates a ratio of the first flux measurement (obtained by the first scanhead 300) to the second flux measurement (obtained by the second scanhead 320) at step 377. The ratio of the flux measurements is compared to the stored known ratio, at step 378, to evaluate the authenticity of the bill 22. According to some embodiments, the ratio is compared to a look-up table which contains the standard known ratios for the various bills the system is designed to process. If the ratio of the flux is not the correct value for the particular bill 22, the bill 22 is flagged as a suspect document at step 382. If, however, the flux ratio is the correct value for the particular bill 22, the bill 22 is determined to be authentic at step 380. The sensitivity of the device can be adjusted by changing the allowed deviation between the flux ratio of the bill 22 being evaluated and the stored flux ratio. As the allowed deviation is reduced, the sensitivity of the device is increased. U.S. Pat. No. 5,909,503, further discusses setting the sensitivity of a currency processing device and is incorporated herein by reference in its entirety.

The above-described authentication method creates a dual verification of the authenticity of the bill. The first authentication occurs when it is determined that a phase change has occurred between the fully magnetized bill and the bill after a reverse polarity field has been applied. The second authentication occurs when it is determined that the flux ratio between the fully magnetized bill and the bill after a reversed polarity field has been applied matches the standard ratio for the particular currency and denomination being authenticated. The utilization of the flux ratio (as opposed to the individual flux determinations) allows the authentication of both crisp, new bills as well as old, worn, and faded bills. The individual flux measurements of a old, worn-down bill will be lower than a new, crisp bill of the same denomination. Thus, were the individual flux measurements of a worn bill to be compared to the stored known flux samples of a new bill, the device may flag an authentic bill as suspect because the values would be different. However, because the present invention evaluates the flux ratio, even as the bill becomes worn, the ratio remains relatively constant. This is because when a bill is worn or faded the signal for both the fully magnetized measurement and the reverse polarity measurement will be lessened in proportion to one another.

Further, the use of a flux ratio allows more design flexibility when incorporating the above-described authentication method into a currency sorting device. The use of the flux ratio allows the transport mechanism to be located at a variety of distances from the sensors because, as the bill becomes further removed from the sensor, both the fully magnetized and reverse polarity measurements will be reduced proportionally. Thus, the use of the flux ratio allows for design flexibility and manufacturing error by eliminating the need for a particular, precise placement of the scanhead relative to the transport path. An example of magnetic properties of bills that can be authenticated using the dual verification method described above, is illustrated in FIGS. 8-9.

Figure 3:
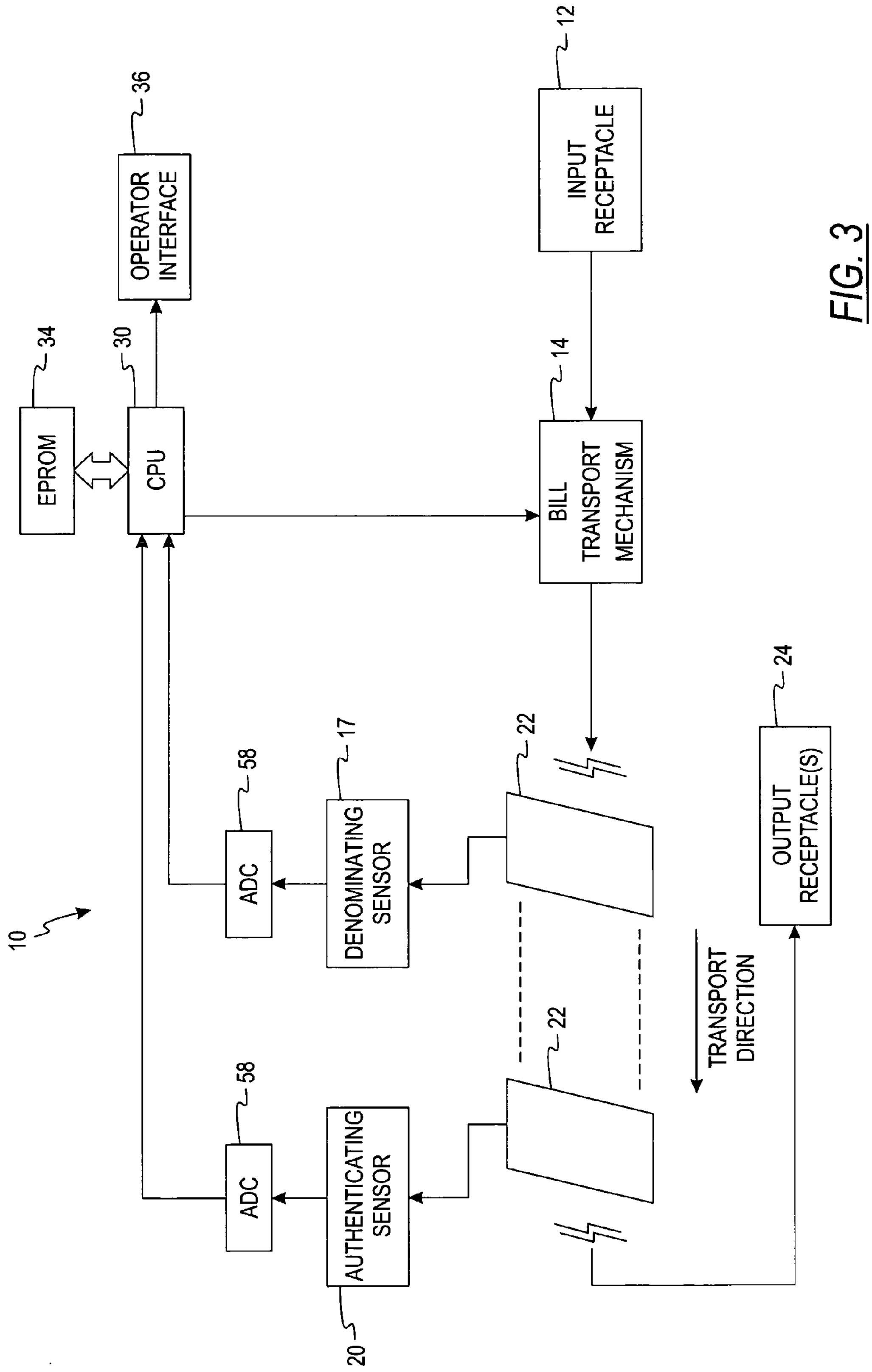
FIG. 3 is a functional block diagram of a currency processing system according to one embodiment of the present invention.

Referring now to FIG. 3, there is shown a functional block diagram of a currency processing system 10 adapted to incorporate the magnetic scanheads 300, 320 or arrays of FIG. 1, according to one embodiment of the present invention. The currency processing system 10 includes an input receptacle 12 for receiving a stack of currency bills to be processed (e.g., counted, denominated, authenticated, etc.). Currency bills placed in the input receptacle 12 are picked out or separated, one bill at a time, and sequentially relayed by a bill transport mechanism 14 past an evaluation region where, for example, information is sensed permitting the determination of the denomination and the authentication of a passing bill. The bill transport mechanism 14 may be any conventional transport mechanism as is know in the art, for example, a transport using driven and passive rollers and belts.

According to the illustrated embodiment, the evaluation region includes a denominating sensor 17 and an authenticating sensor 20 for obtaining denominating information and authenticating information, respectively, from each currency bill 22 transported past the sensors. The bill 22 is then transported to one or more output receptacles 24 where processed bills are collected for subsequent removal. The output receptacle(s) 24 may include a pair of stacking wheels 126 (FIG. 6) for stacking the bills in the output receptacle(s) 24. The system 10 includes an operator interface 36 for displaying information to an operator and/or receiving operator input from an operator.

Figure 4:
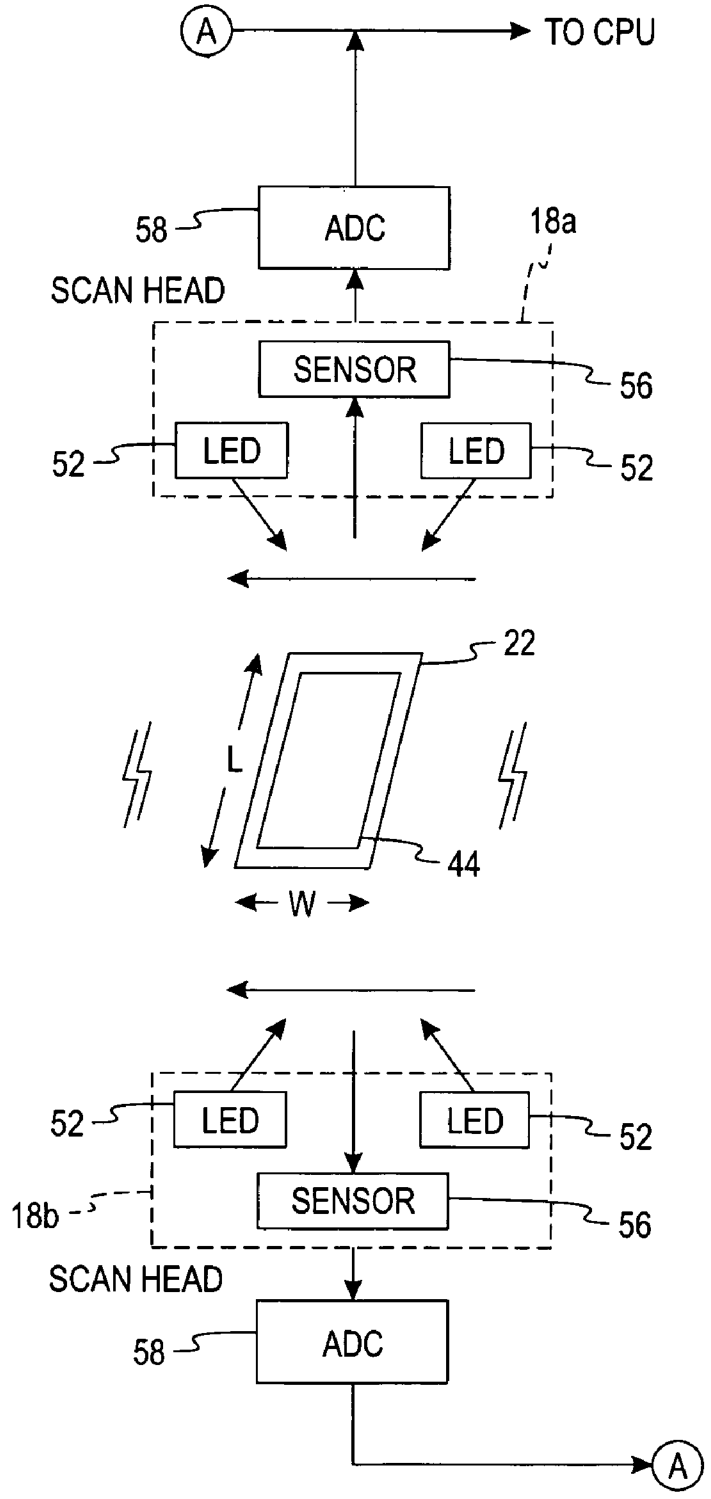
FIG. 4 is a function block diagram of a pair of optical sensors for use with the currency processing system of FIG. 3 according to one embodiment of the present invention.

Referring also to FIG. 4, according to some embodiments the denominating sensor 17 comprises a pair of optical scanheads 18*a* and 18*b* for scanning optical information from both surfaces of a currency bill. Alternatively, a single optical sensor can be used to scan a single side of the bill being transported. According to other embodiments, other types of denomination sensors are used to determine the denomination of the bill 22.

According to the embodiment illustrated in FIG. 4, the upper (as viewed in FIG. 4) optical scanhead 18*a* scans a surface of the bill 22 and the lower (as viewed in FIG. 4) optical scanhead 18*b* scans an opposite surface of the bill 22. Each optical scanhead 18*a,b* comprises a pair of light sources 52, such as light emitting diodes (LEDs), that direct light onto the bill transport path so as to illuminate a substantially rectangular light strip 44 upon a currency bill 22 positioned on the transport path adjacent the scanhead 18. Light reflected off the illuminated strip 44 is sensed by an optical sensor 56 (e.g., a photodetector, a CCD, etc.) positioned between the two light sources 52. The analog output of the optical sensor 56 is converted into a digital signal by an analog-to-digital converter (ADC) 58 that outputs a digital signal to the CPU 30. The CPU 30 uses the digitized signal in conjunction with stored master denominating information or data to determine the denomination of a bill. For example, according to some embodiments, the CPU 30 compares the digitized signal to stored digitized signals obtained for know genuine bills to determine the denomination of the currency bills.

Referring to FIG. 3, according to the illustrated embodiment, the bill transport path is defined in such a way that the transport mechanism 14 moves currency bills 22 with the narrow dimension of the bills 22 parallel to the transport direction. Alternatively, the bills 22 could be moved with the wide dimension of the bills 22 parallel to the transport path. In the embodiment of FIG. 4, as a bill 22 traverses the denominating sensor 17, the light strip 44 effectively scans the bill across the narrow dimension of the bill 22. In the depicted embodiment, the transport path is arranged so that a currency bill 22 is scanned across a central section of the bill 22 along its narrow dimension. Alternatively, according to one embodiment of the present invention, the transport mechanism 14 moves currency bills 22 with the wide dimension of the bills 22 parallel to the transport path and the scan direction. According to another embodiment of the present invention, the bill 22 is scanned across a non-central section, such as, for example, the edge or corner regions. According to another embodiment, the bill 22 is scanned along multiple regions and/or in multiple sections. According to yet another embodiment, the bill 22 is scanned over its entire width and/or length.

Each scanhead 18 detects light reflected from the bill 22 as it moves across the illuminated light strip 44 and to provide an analog representation of the variation in reflected light, which, in turn, represents the variation in the dark and light content of the printed pattern or indicia on the surface of the bill 22. This variation in light reflected from the narrow dimension scanning of the bills serves as a measure for distinguishing, with a high degree of confidence, among a number of currency types and denominations that the system is programmed to process. The use of this type of scanning is described in U.S. Pat. Nos. 5,815,592 and 5,687,963, which are incorporated herein by reference in their entirety.

According to some embodiments, the system is also capable of "learning" master denominating information when an operator processes the required number of genuine notes. This type of neural-network "learning" is well known in the art, and need not be detailed further for this particular invention. The use of neural-network learning is more thoroughly described in U.S. Pat. Nos. 6,072,565; 6,237,739; and 6,241, 069, which are incorporated herein by reference in their entirety.

In other embodiments, the denominating sensor may only include a single scanhead 18*a* or 18*b* for scanning one surface of a bill. In other alternative embodiments of the present invention, additional sensors replace or are used in conjunction with the optical scanheads 18*a,b* in the system 10 to analyze, authenticate, denominate, count, and/or otherwise process currency bills. For example, size detection sensors, magnetic sensors, thread sensors, and/or ultraviolet/fluorescent/infrared light sensors may be used in the currency processing device 10 to evaluate currency bills. The use of these types of sensors for currency evaluation are described in U.S. Pat. No. 5,790,697, which is incorporated herein by reference in its entirety. Further, a fitness sensor that may be used in connection with the currency processing system of FIG. 3 is described in U.S. Patent Publication No. US2003/0168308 A1, entitled "Currency Processing System With Fitness Detection," which is incorporated herein by reference in its entity.

In alternative applications, wherein the operator expects that all the bills 22 are of the same denomination, and desires to simply authenticate and/or count the stack of currency bills 22, the operator may input the denomination of the bills to be processed via the operator interface 36. In this embodiment, any bill not of the expected denomination would be flagged as a stranger bill.

Referring now to FIG. 5, there is shown a functional block diagram of a currency processing system 410 adapted to incorporate the magnetic scanheads 300, 320 or arrays of FIG. 1, according to one embodiment of the present invention. The currency processing system 410 includes an input receptacle 412 for receiving a stack of currency bills to be processed (e.g., counted, denominated, authenticated, etc.). Currency bills placed in the input receptacle 412 are picked out or separated, one bill at a time, and sequentially relayed by a bill transport mechanism 414. The bill transport mechanism 414 may be any type of transport mechanism as is know in the art, for example, a transport using driven and passive rollers and belts.

The transport mechanism 414 transports a bill 422 past an authenticating sensor 420. The authenticating sensor 420 is for obtaining authenticating characteristic information from each currency bill 422 transported past the sensors. The authenticating sensor 420 may be adapted to incorporate scanheads 300 and 320. The bill 422 is then transported to one or more output receptacles 424 where processed bills are collected for subsequent removal. The system 410 includes an operator interface 436 for displaying information to an operator and/or receiving operator input from an operator.

According to the illustrated embodiment, the bill transport path is defined in such a way that the transport mechanism 414 moves currency bills 422 with the narrow dimension of the bills 422 parallel to the transport direction. Alternatively, the bills 422 could be moved with the wide dimension of the bills 422 parallel to the transport path.

Figure 6:
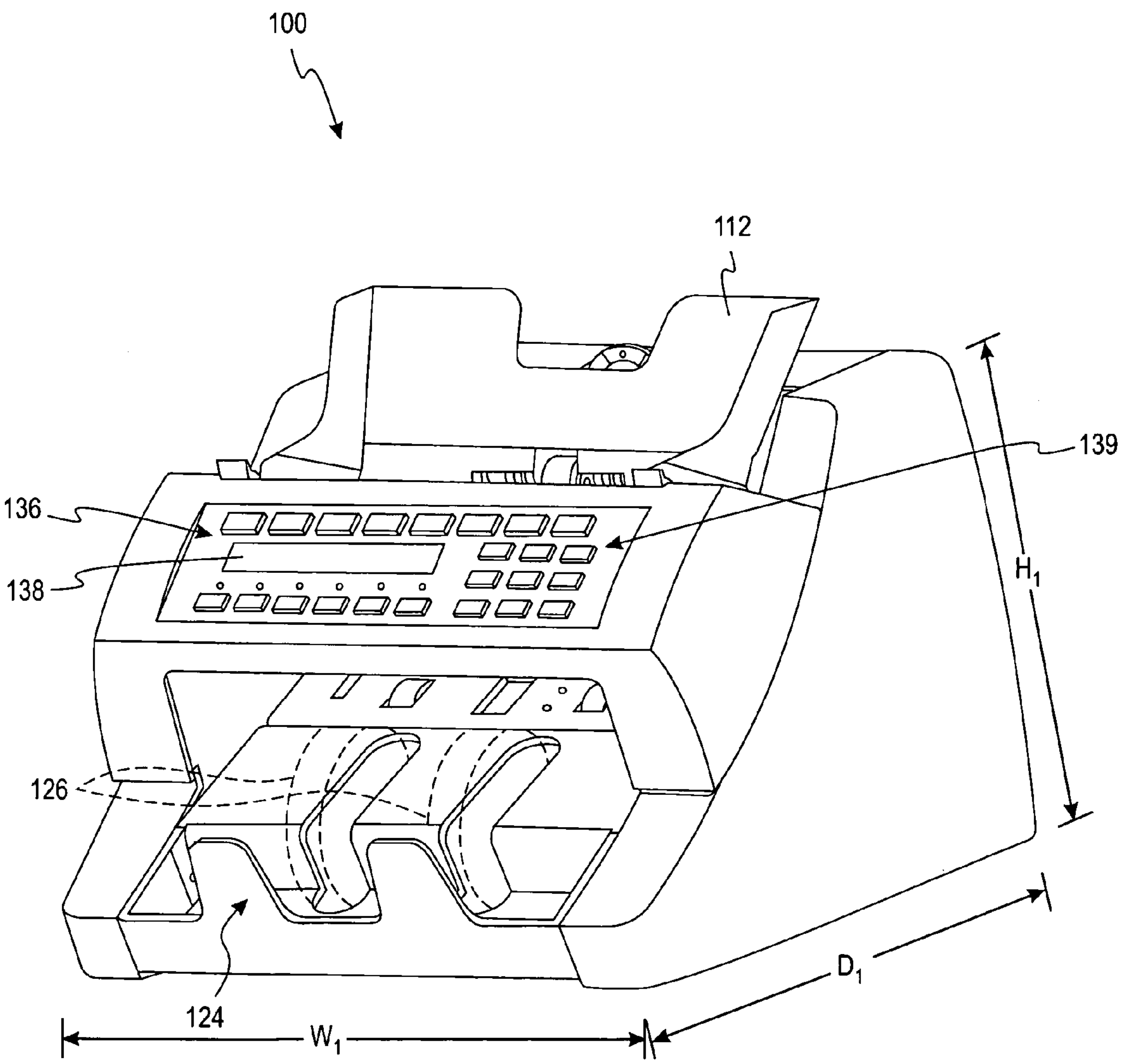
FIG. 6 is a perspective view of a single-pocket currency processing device incorporating the currency processing system of FIG. 3 according to one embodiment of the present invention.

Referring to FIG. 6, there is shown a currency processing device 100 having a single output receptacle that may incorporate the currency processing system 10 of FIG. 3 or the currency processing system 410 of FIG. 5. The currency processing device 100 having a single output receptacle is commonly referred to as a single-pocket device. The single-pocket device 100 includes an input receptacle 112 for receiving a stack of currency bills to be processed. The currency bills in the input receptacle 112 are picked out or separated, one bill at a time, and sequentially relayed by the bill transport mechanism 14 (FIG. 3) past one or more sensors. The scanned bill 22 is then transported to an output receptacle 124, which may include a pair of stacking wheels 126, where processed bills are stacked for subsequent removal. The single-pocket device 100 includes an operator interface 136 with a display 138 for communicating information to an operator of the device 100, and buttons 139 for receiving operator input. In alternative embodiments, the operator interface 136 may comprise a touch-screen-type interface. Additional details of the operational and mechanical aspects of the single-pocket device 100 are described in U.S. Pat. Nos. 5,295,196 and 5,815,592, each of which is incorporated herein by reference in its entirety. According to various alternative embodiments, the currency processing device 10 is capable of processing, including denominating the bills, from about 600 to over 1500 bills per minute.

The single-pocket device 100 is compact and designed to be rested on a tabletop. The device 100 of FIG. 6 has a height ($H_1$) of about 9½ inches (about 24 cm), a width ($W_1$) of about 11-15 inches (about 28-38 cm), and a depth ($D_1$) of about 12-16 inches (about 30-40 cm), which corresponds to a footprint ranging from about 130 $in^2$ (about 850 $cm^2$) to about 250 $in^2$ (about 1600 $cm^2$) and a volume ranging from about 1200 $in^3$ (about 20,000 $cm^3$) to about 2300 $in^3$ (about 38,000 $cm^3$).

Figure 7:
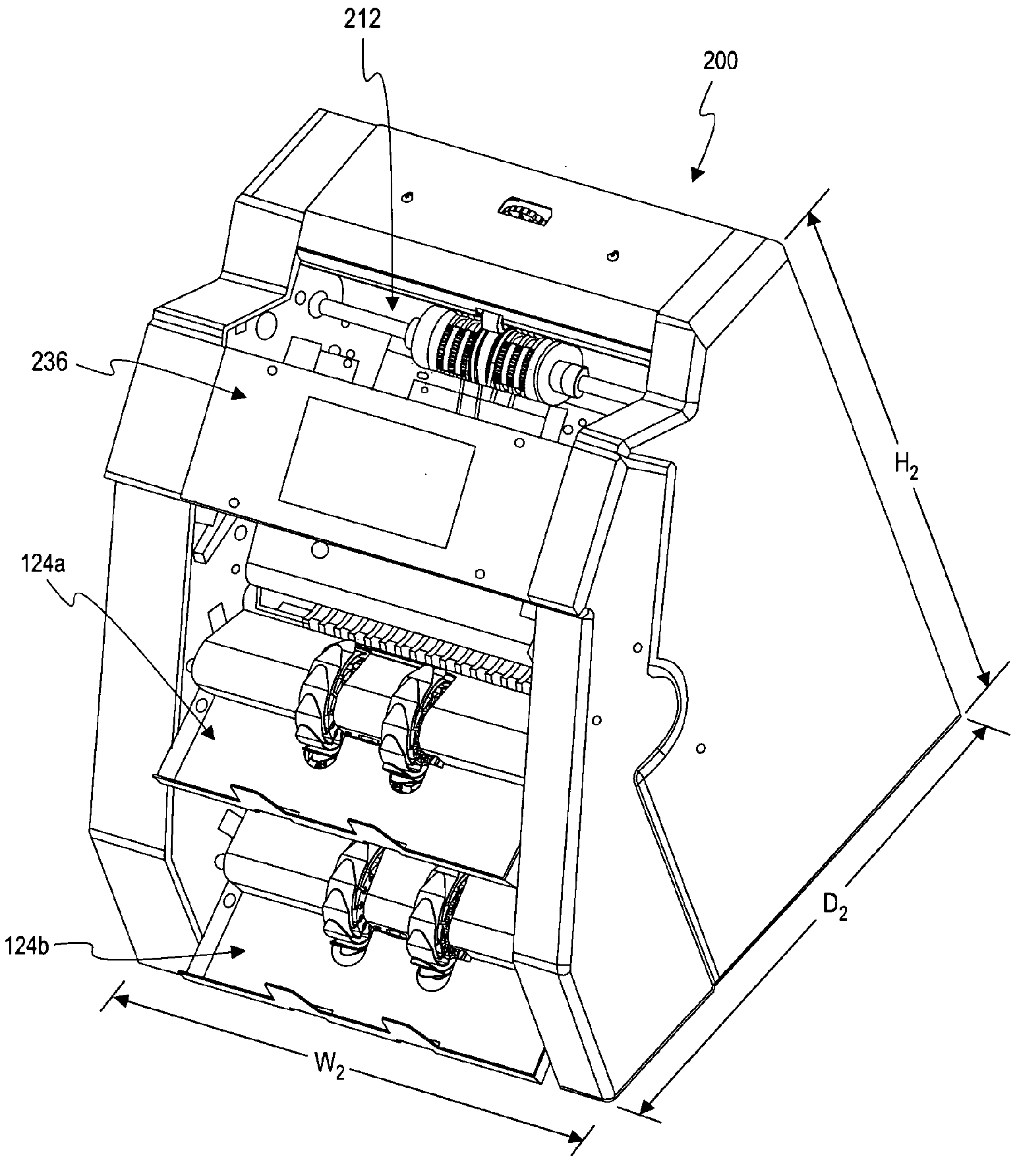
FIG. 7 is a perspective view of a two-pocket currency processing device incorporating the currency processing system of FIG. 3 according to another embodiment of the present invention.

Referring now to FIG. 7, the currency processing system 10 of FIG. 3 or the currency processing system 410 of FIG. 5 may be incorporated into a currency processing device having more than one output receptacle in alternative embodiments of the present invention. For example, a currency processing device 200 having two output receptacles (e.g., a two-pocket device)—a first output receptacle 124*a* and a second output receptacle 124*b*—may incorporate magnetic sensors in accordance with the present invention. Generally, the two-pocket device 200 operates in a similar manner to that of the single-pocket device 100 (FIG. 6), except that the transport mechanism of the two-pocket device 200 transports the bills from an input receptacle 212 past one or more sensors (e.g., the sensor 20 of FIG. 3) to either of the two output receptacles 124*a*, 124*b*.

The two output receptacles 124*a,b* may be utilized in a variety of fashions according in various applications. For example, in the processing of currency bills, the bills may be directed to the first output receptacle 124*a* until a predetermined number of bills have been transported to the first output receptacle 124*a* (e.g., until the first output receptacle 124*a* reaches capacity or a strap limit) and then subsequent bills may be directed to the second output receptacle 124*b*. In another application, all bills are transported to the first output receptacle 124*a* except those bills triggering error signals such as, for example, "no call" and "suspect document" error signals, which are transported to the second output receptacle 124*b*. The two-pocket device 200 includes operator interface 236 for communicating with an operator of the two-pocket device 200. Further details of the operational and mechanical aspects of the two-pocket device 200 are detailed in U.S. Pat. Nos. 5,966,546; 6,278,795; and 6,311,819; each of which is incorporated herein by reference in its entirety.

The two-pocket device 200 is compact having a height ($H_2$) of about 17½ inches (about 44 cm), a width ($W_2$) of about 13½ inches (about 34 cm), and a depth ($D_2$) of about 15 inches (about 38 cm), and weighs approximately 35 lbs. (about 16 kg). The two-pocket device 200 is compact and is designed to be rested upon a tabletop. The two-pocket device 200 has a footprint of less than about 200 $in^2$ (about 1300 $cm^2$) and occupies a volume of less than about 3500 $in^3$ (about 58,000 $cm^3$).

In yet other alternative embodiments of the present invention, the currency processing system 10 of FIG. 3 or the currency processing system 410 of FIG. 5 may be implemented in a currency processing device having more than one output receptacle or more than two-output receptacles. Examples of currency processing devices having three, four, five, and six output receptacles are described in U.S. Pat. Nos. 6,398,000 and 5,966,456, each of which is incorporated herein in its entirety; as well as in U.S. patent application Ser. No. 10/903,745 filed Jul. 30, 2004, entitled "Apparatus and Method for Processing Documents Such as Currency Bills", which is incorporated herein by reference in its entirety.

While the embodiments discussed in this patent have focused on the authentication of currency bills, the inventors recognize that this invention is equally applicable to the authentication of any article having a magnetic security feature, such as, for example, banking documents, travel documents, checks, deposit slips, coupons and loan payment documents, food stamps, cash tickets, savings withdrawal tickets, check deposit slips, savings deposit slips, traveler checks, lottery tickets, casino tickets, passports, visas, driver licenses, and/or all other documents utilized as a proof of deposit at financial institutions.

Figure 8:
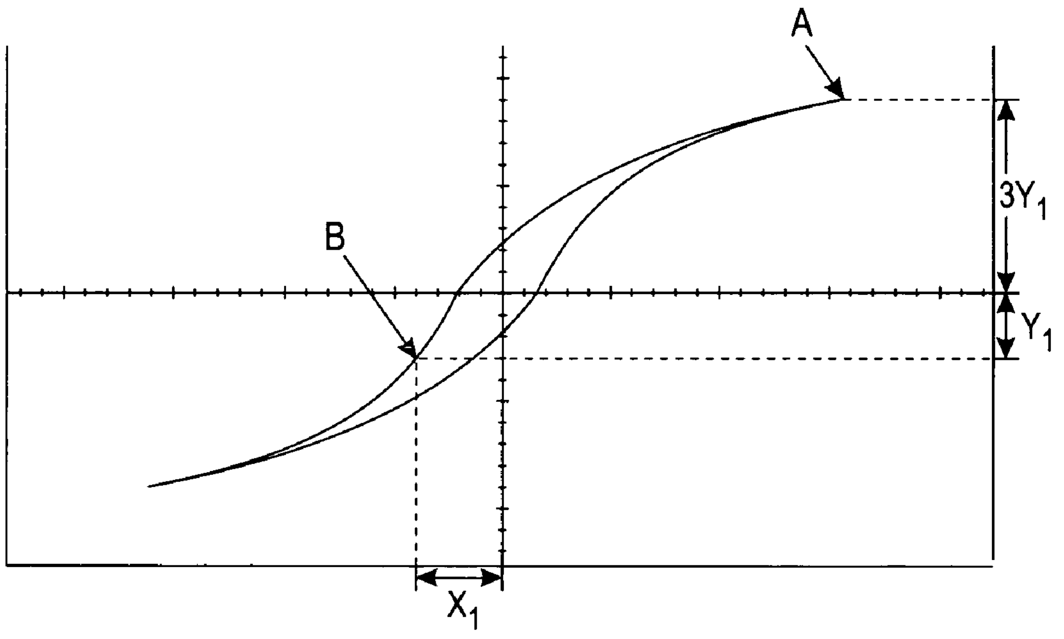
FIG. 8 is an example of a hysterisis curve for a document containing magnetic material.
Figure 9:
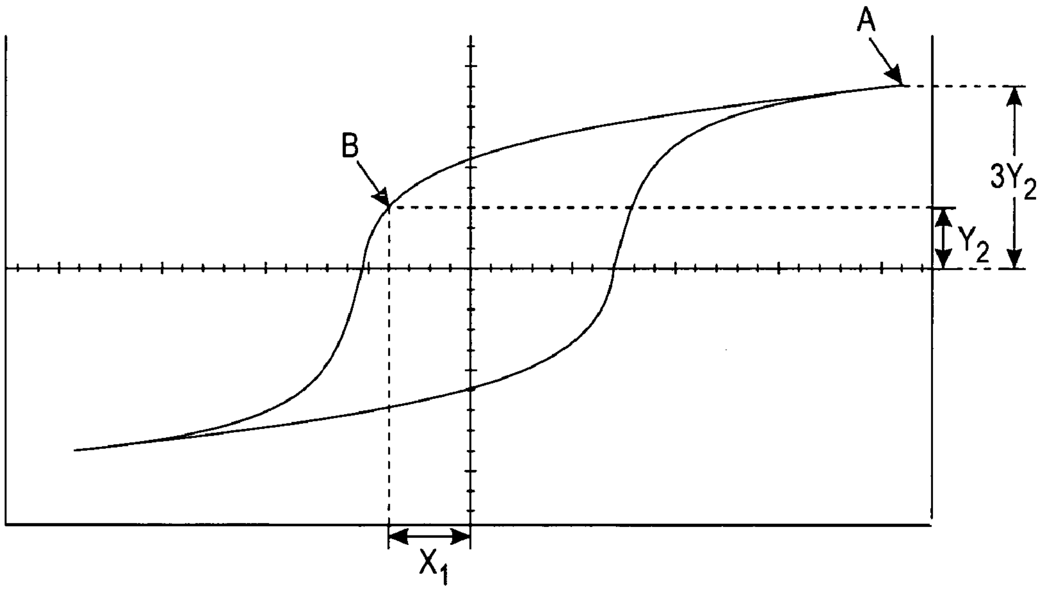
FIG. 9 is an example of a hysterisis curve for a document containing magnetic material.

Referring now to FIGS. 8-9, two examples of hysteresis curves are illustrated to assist in understanding the dual verification authentication method. In FIG. 8, the hysteresis curve for a first magnetic document is shown, while the hystersis curve for a second magnetic document is shown in FIG. 9. As is standard with hysteresis curves, the Y-axis represents the M (the magnetization of the material in or on the document) and the X-axis represents H (the intensity of the applied magnetic field).

As discussed above, the first scanhead 300 (FIG. 1) is used to create a field in a first direction to completely saturate the magnetic material in a document. The magnetization of the saturated materials is illustrated by point A along the curves. As can be seen, a greater field intensity, H, is required to saturate the second magnetic document (FIG. 9), but the intensity of the field produced by the first scanhead 300 can be assumed to be large enough to saturate both documents. As illustrated, the distance from the X-axis to point A in both FIGS. 8-9 is 3 Y, which represents the magnetization of the materials at saturation.

After the first scanhead 300 saturates the magnetic material, the second scanhead 320 is used to create a field in a second direction. As illustrated the second scanhead 320 creates a field of intensity $X_1$. The magnetization of the materials at intensity $X_1$ is illustrated by point B along the curves. The distance from the X-axis to point A in FIG. 8 is $3Y_1$ while the distance is $3Y_2$ in FIG. 9. Similarly, the distance from the X-axis to point B in FIG. 8 is $Y_1$ while the distance is $Y_2$ in FIG. 9. However, as can be seen in FIGS. 8-9, the magnetization of the materials in the first document and the second document at point B are in opposite directions.

FIGS. 8-9 illustrate the importance of ensuring that the polarities of the flux after the document's exposure to the first field and the second field are opposite. As illustrated, were only the ratio of point A to point B to be calculated, both documents would be determined to be identical, though as is clearly illustrated, the documents have disparate magnetic properties. However, the documents can easily be evaluated as being different when the polarities at point B are compared.

Alternative Embodiment A

A currency processing device having an input receptacle adapted to receive a stack of bills to be processed and a transport mechanism adapted to transport bills, one at a time, from the input receptacle along a transport path to at least one output receptacle, the device comprising:

a denominating sensor disposed along the transport path adapted to obtain denominating characteristic information from each of the bills;

a memory adapted to store master denominating characteristic information and master authentication information;

a first magnetic scanhead disposed along the transport path downstream from the denominating sensor, the first magnetic scanhead being adapted to create a first magnetic field for saturating the magnetization of an area on each of the bills;

a second magnetic scanhead disposed along the transport path downstream from the first magnetic scanhead, the second magnetic scanhead being adapted to create a second magnetic field of variable intensity, the second magnetic field being of opposite polarity from the first magnetic field; and a processor being adapted to receive the denominating characteristic information from the denominating sensor, the controller being adapted to determine the denomination of each of the bills when the obtained denominating characteristic information favorably compares to the stored master denominating characteristic information, the controller being adapted to adjust the second magnetic field intensity based on the determined denomination of each of the bills.

Alternative Embodiment B

The currency processing device of Alternative Embodiment A, wherein the first magnetic scanhead includes a first sensor for measuring the magnetic flux of the area on each of the bills in response to the first magnetic field and the second magnetic scanhead includes a second sensor for measuring the flux of the area on each of the bills in response to the second magnetic field.

Alternative Embodiment C

The currency processing device of Alternative Embodiment B, wherein the controller is adapted to determine a flux ratio of the first magnetic flux measurement to the second magnetic flux measurement.

Alternative Embodiment D

The currency processing device of Alternative Embodiment C, wherein the controller is adapted to compare the determined flux ratio for each of the bills to the stored master authentication information.

Alternative Embodiment E

The currency processing device of Alternative Embodiment D, wherein the controller is adapted to authenticate each of the bills when the determined flux ratio favorably compares to the stored master authentication information.

Alternative Embodiment F

The currency processing device of Alternative Embodiment D, wherein the controller is adapted to generate an error signal when the determined flux ratio does not favorably compare to the stored master authentication information.

Alternative Embodiment G

A currency processing device having an input receptacle adapted to receive a stack of bills to be processed and a transport mechanism adapted to transport bills, one at a time, from the input receptacle along a transport path to at least one output receptacle, the device comprising:

a means for determining the denomination of each of the bills;

a first magnetic scanhead disposed along the transport path, the first magnetic scanhead being adapted to create a first magnetic field for saturating the magnetization of an area on each of the bills, the first magnetic scanhead including a first sensor for measuring the flux of each of the bill in response to the first magnetic field;

a second magnetic scanhead disposed along the transport path downstream from the first magnetic scanhead, the second magnetic scanhead being adapted to create a second magnetic field of variable intensity, the second magnetic field being of opposite polarity from the first magnetic field, the second magnetic scanhead including a second sensor for measuring the flux of each of the bills in response to the second magnetic field, the second magnetic scanhead being adjustable to vary the intensity of the magnetic field;

a memory adapted to store master field strength information and master authentication information;

a controller being adapted to determine the required field strength of the second magnetic field by comparing the determined denomination to the master field strength information, the controller being adapted to adjust the second magnetic field intensity based on the required field strength determination, the controller is adapted to determine a flux ratio of the first magnetic flux measurement to the second magnetic flux measurement, the controller being adapted to compare the determined flux ratio for each bill to the stored master authentication information.

Alternative Embodiment H

The currency processing device of Alternative Embodiment G, wherein the controller is adapted to authenticate each of the bills when the determined flux ratio favorably compares to the stored master authentication information.

Alternative Embodiment I

The currency processing device of Alternative Embodiment G, wherein the controller is adapted to generate an error signal when the determined flux ratio does not favorably compare to the stored master authentication information.

Alternative Embodiment J

A method for determining the authenticity of currency bills with a currency processing device, the currency processing device adapted to determine the denomination of each of the currency bills, the method comprising:

transporting each of the currency bills past a first magnetic scanhead and a second magnetic scanhead located downstream from the first magnetic scanhead, the first magnetic scanhead including a first sensor, and the second magnetic scanhead including a second sensor;

creating a first magnetic field for saturating the magnetization of an area on each of the bills;

measuring with the first sensor the magnetic flux of the area on each of the bills in response to the first magnetic field;

adjusting the intensity of the second magnetic field based on the denomination of each of the currency bills, the second magnetic field being of opposite polarity from the first magnetic field;

measuring with the second sensor the magnetic flux of the area on each of the bills in response to the second magnetic field; and determining a flux ratio of the first magnetic flux measurement to the second magnetic flux measurement.

Alternative Embodiment K

The method of Alternative Embodiment J further comprising providing a controller being adapted to adjust the second magnetic field intensity based on the determined denomination of each of the bills and to determine the flux ratio of the first magnetic flux measurement to the second magnetic flux measurement.

Alternative Embodiment L

The method of Alternative Embodiment K further comprising comparing the determined flux ratio for each of the bills to stored master authentication information, the controller performing the comparison.

Alternative Embodiment M

The method of Alternative Embodiment L, further comprising deeming the bill authentic when the determined flux ratio is favorably compared to the stored master authentication information.

Alternative Embodiment N

The method of Alternative Embodiment L, further comprising generating an error signal when the determined flux ratio does not favorably compare to the stored master authentication information.

Alternative Embodiment O

The method of Alternative Embodiment J wherein the first magnetic scanhead is contained in a first array of magnetic scanheads and the second magnetic scanhead is contained in a second array of magnetic scanheads.

Alternative Embodiment P

The method of Alternative Embodiment O wherein the first array of magnetic scanheads and the second array of magnetic scanheads are capable of scanning the entire width of the bill.

Alternative Embodiment Q

The method of Alternative Embodiment O wherein the first array of magnetic scanheads and the second array of magnetic scanheads are capable of scanning the entire length of the bill.

Alternative Embodiment R

A currency processing device having an input receptacle adapted to receive a stack of bills to be processed and a transport mechanism adapted to transport bills, one at a time, from the input receptacle along a transport path to at least one output receptacle, the device comprising:

a denominating sensor disposed along the transport path adapted to obtain denominating characteristic information from each of the bills;

a memory adapted to store master denominating characteristic information and master authentication information;

a first array comprising a plurality of magnetic scanheads, the first array being disposed along the transport path downstream from the denominating sensor, the plurality of scanheads being adapted to create at least one first magnetic field for saturating the magnetization of an area on each of the bills;

a second array comprising a plurality of magnetic scanheads, the second array being disposed along the transport path downstream from the first magnetic scanhead, the plurality of magnetic scanheads being adapted to create at least one second magnetic field of variable intensity, the at least one second magnetic field being of opposite polarity from the at least one first magnetic field; and a controller being adapted to receive the denominating characteristic information from the denominating sensor, the controller being adapted to determine the denomination of each of the bills when the obtained denominating characteristic information favorably compares to the stored master denominating characteristic information, the controller being adapted to adjust the second magnetic field intensity in each of the magnetic scanhead contained in a second array of magnetic scanheads based on the determined denomination of each of the bills and location of the magnetic area in the bill.

Alternative Embodiment S

The currency processing device of Alternative Embodiment R, wherein the plurality of magnetic scanheads of the first array each have a first sensor for measuring the magnetic flux of the area on each of the bills in response to the first magnetic field and the plurality of magnetic scanheads of the second array each have a second sensor for measuring the flux of the area on each of the bills in response to the second magnetic field.

Alternative Embodiment T

The currency processing device of Alternative Embodiment S, wherein the controller is adapted to determine a flux ratio of the first magnetic flux measurements to the second magnetic flux measurements in each of the magnetic areas of the bill.

Alternative Embodiment U

The currency processing device of Alternative Embodiment S, wherein the controller is adapted to compare the determined flux ratios for each of the bills to the stored master authentication information.

Alternative Embodiment V

The currency processing device of Alternative Embodiment U, wherein the controller is adapted to authenticate each of the bills when the determined flux ratios favorably compare to the stored master authentication information.

Alternative Embodiment W

The currency processing device of Alternative Embodiment V, wherein the controller is adapted to generate an error signal when the determined flux ratios do not favorably compare to the stored master authentication information.

Alternative Embodiment X

A magnetic detection system for authenticating a document, the magnetic detection system comprising:

a first magnetic scanhead being adapted to create a first magnetic field for saturating the magnetization of an area on each of the bills;

a second magnetic scanhead including an electromagnet, the electromagnet being capable of creating a second magnetic field of adjustable intensity, the second magnetic field being of opposite polarity from the first magnetic field;

wherein the intensity of the second magnetic field is adjusted by changing the amount of current supplied to the electromagnet, wherein the amount of current supplied to the electromagnet is based upon a characteristic of the document to be authenticated.

Alternative Embodiment Y

The magnetic detection system of Alternative Embodiment X, further comprising a controller being adapted to adjust the second magnetic field by changing the amount of current supplied to the electromagnet, wherein the controller adjusts the supplied current based on the characteristic of the document to be authenticated.

Alternative Embodiment Z

The magnetic detection system of Alternative Embodiment X, wherein the magnetic detection system is incorporated into a currency processing device.

Alternative Embodiment AA

The magnetic detection system of Alternative Embodiment Z, wherein the characteristic of the document is a predetermined magnetic pattern of an authentic document.

Alternative Embodiment AB

The magnetic detection system of Alternative Embodiment AA, wherein the document is a currency bill.

Alternative Embodiment AC

The magnetic detection system of Alternative Embodiment X, wherein the characteristic of the document is a predetermined magnetic pattern of an authentic document.

Alternative Embodiment AD

The magnetic detection system of Alternative Embodiment X, wherein the second magnetic scanhead includes a permanent magnet adapted to supply a portion of the second magnetic field.

Alternative Embodiment AE

The magnetic detection system of Alternative Embodiment X, wherein the second magnetic scanhead is adapted to create a field from about 0 Oe to about 3000 Oe.

Alternative Embodiment AF

The magnetic detection system of Alternative Embodiment AE, wherein the second magnetic scanhead includes a permanent magnet adapted to supply a portion of the field from about 0 Oe to about 3000 Oe.

Alternative Embodiment AG

The magnetic detection system of Alternative Embodiment X, wherein the second magnetic scanhead is adapted to create a field from about 0 Oe to about 10 Oe.

Alternative Embodiment AH

The magnetic detection system of Alternative Embodiment AG, wherein the scanhead includes a permanent magnet adapted to supply a portion of the field from about 0 Oe to about 10 Oe.

Alternative Embodiment AI

The magnetic detection system of Alternative Embodiment X, wherein the second magnetic scanhead is adapted to create a field from about 10 Oe to about 350 Oe.

Alternative Embodiment AJ

The magnetic detection system of Alternative Embodiment AI, wherein the second magnetic scanhead includes a permanent magnet adapted to supply a portion of the field from about 10 Oe to about 350 Oe.

Alternative Embodiment AK

The magnetic detection system of Alternative Embodiment X, wherein the second magnetic scanhead is adapted to create a field from about 350 Oe to about 3000 Oe.

Alternative Embodiment AL

The magnetic detection system of Alternative Embodiment AK, wherein the second magnetic scanhead includes a permanent magnet adapted to supply a portion of the field from about 350 Oe to about 3000 Oe.

Alternative Embodiment AM

The magnetic detection system of Alternative Embodiment X, wherein the second magnetic scanhead is adapted to create a field in excess of about 3000 Oe.

Alternative Embodiment AN

The magnetic detection system of Alternative Embodiment AM, wherein the second magnetic scanhead includes a permanent magnet adapted to supply a portion of the field in excess of about 3000 Oe.

Alternative Embodiment AO

A magnetic scanhead for sensing a flux measurement of a document being transported past the scanhead, comprising:

a first pole piece perpendicular to the transport direction;

a second pole piece perpendicular to the transport direction and parallel to the first pole piece;

a middle section located between the first pole piece and the second pole piece;

a coil having a conductive core and an insulating material, the coil being twisted around at least a portion of the first pole piece, the coil having a plurality of ends;

at least one power supply wherein the plurality of ends of the coil are electrically connected to the power supply, the power supply being adapted to supply an adjustable and reversible D.C. electric current to the coil;

a sensor between the first pole piece and the second pole piece, the sensor being adapted to sense the flux measurement of the document being transported.

Alternative Embodiment AP

The magnetic scanhead of Alternative Embodiment AO, wherein the middle section is a permanent magnet.

Alternative Embodiment AQ

The magnetic scanhead of Alternative Embodiment AO, wherein the coil is twisted around both a portion of the first pole piece and a portion of the second pole piece.

Alternative Embodiment AR

The magnetic scanhead of Alternative Embodiment AO, further comprising:

a second coil having a conductive core and an insulating material, the second coil being twisted around at least a portion of the first pole piece, the second coil having a plurality of ends.

Alternative Embodiment AS

The magnetic scanhead of Alternative Embodiment AR, wherein the plurality of ends of the second coil are electrically connected to the power supply.

Alternative Embodiment AT

The magnetic scanhead of Alternative Embodiment AR, wherein the plurality of ends of the second coil are electrically connected to a second power supply the second power supply being adapted to supply an adjustable and reversible D.C. electric current to the second coil.

Alternative Embodiment AU

The magnetic scanhead of Alternative Embodiment AO, wherein the first pole piece is composed of a soft magnetic material.

Alternative Embodiment AV

The magnetic scanhead of Alternative Embodiment AS, wherein the soft magnetic material is cold-rolled steel.

Alternative Embodiment AW

The magnetic scanhead of Alternative Embodiment AU, wherein the soft magnetic material is permalloy.

Alternative Embodiment AX

The magnetic scanhead of Alternative Embodiment AU, wherein the soft magnetic material is mumetal.

Alternative Embodiment AY

The magnetic scanhead of Alternative Embodiment AO, wherein the first pole piece is composed of a permanent magnetic material.

Alternative Embodiment AZ

The magnetic scanhead of Alternative Embodiment AO, wherein the coil and power supply provide the magnetic scanhead with between about 0.0 amp-turns to about 0.1 amp-turns.

Alternative Embodiment BA

The magnetic scanhead of Alternative Embodiment AO, wherein the coil and power supply provide the magnetic scanhead with between about 0.1 amp-turns to about 2 amp-turns.

Alternative Embodiment BB

The magnetic scanhead of Alternative Embodiment AO, wherein the coil and power supply provide the magnetic scanhead with greater than about 2 amp-turns.

Alternative Embodiment BC

The magnetic scanhead of Alternative Embodiment AO, wherein the sensor is a magnetoresistive sensor.

Alternative Embodiment BD

The magnetic scanhead of Alternative Embodiment AO, wherein the sensor is an audio head.

While the invention is susceptible to various modifications and alternative forms, specific embodiments thereof are shown by way of example in the drawings and described in detail herein. It should be understood, however, that it is not intended to limit the invention to the particular forms disclosed, but on the contrary, the intention is to cover all modifications, equivalents, and alternatives falling within the spirit and scope of the invention as defined by the appended claims.

The invention claimed is:

1. A magnetic detection system for authenticating a document, the magnetic detection system comprising:

a first magnetic scanhead being adapted to create a first magnetic field for saturating the magnetization of an area on the document;

a second magnetic scanhead including an electromagnet, the electromagnet being configured to create a second magnetic field of adjustable intensity, the second magnetic field being of opposite polarity from the first magnetic field;

wherein the intensity of the second magnetic field is adjusted by changing the amount of current supplied to the electromagnet, wherein the amount of current supplied to the electromagnet is adjusted based upon a characteristic of the document to be authenticated.

2. The magnetic detection system of claim 1, further comprising a controller being adapted to adjust the second magnetic field by changing the amount of current supplied to the electromagnet, wherein the controller adjusts the supplied current based on the characteristic of the document to be authenticated.

3. The magnetic detection system of claim 1, wherein the characteristic of the document is a predetermined magnetic pattern of an authentic document.

4. The magnetic detection system of claim 1, wherein the second magnetic scanhead includes a permanent magnet adapted to supply a portion of the second magnetic field.

5. The magnetic detection system of claim 1, wherein the second magnetic scanhead is adapted to create a plurality of fields between about 0 Oe and about 3000 Oe.

6. The magnetic detection system of claim 5, wherein the second magnetic scanhead includes a permanent magnet adapted to supply a portion of the plurality of fields between about 0 Oe and about 3000 Oe.

7. The magnetic detection system of claim 1, wherein the second magnetic scanhead is adapted to create a field from about 0 Oe to about 10 Oe.

8. The magnetic detection system of claim 1, wherein the second magnetic scanhead is adapted to create a field from about 10 Oe to about 350 Oe.

9. The magnetic detection system of claim 1, wherein the second magnetic scanhead is adapted to create a field from about 350 Oe to about 3000 Oe.

10. The magnetic detection system of claim 1, wherein the second magnetic scanhead is adapted to create a field in excess of about 3000 Oe.

11. The magnetic detection system of claim 1, further comprising a sensor configured to receive an indication of the characteristic of the document to be authenticated; wherein the amount of current supplied to the electromagnet is automatically adjusted based upon the indication.

12. The magnetic detection system of claim 11, wherein the document is a currency bill and the characteristic of the document to be authenticated is a denomination.

13. The magnetic detection system of claim 11, wherein the sensor is an optical sensor.

14. The magnetic detection system of claim 1, further comprising a user input configured to receive a manually supplied indication of the characteristic of the document to be authenticated.

15. A magnetic scanhead for sensing a flux measurement of a document being transported past the scanhead, comprising:

a first pole piece generally perpendicular to a transport direction of the document;

a second pole piece generally perpendicular to the transport direction and generally parallel to the first pole piece;

a middle section located between the first pole piece and the second pole piece;

a coil having a conductive core and an insulating material, the coil being twisted around at least a portion of the first pole piece, the coil having a plurality of ends;

at least one power supply wherein the plurality of ends of the coil are electrically connected to the power supply, the power supply being adapted to supply an adjustable and reversible D.C. electric current to the coil;

a sensor between the first pole piece and the second pole piece, the sensor being adapted to sense the flux measurement of the document being transported.

16. The magnetic scanhead of claim 15, wherein the middle section is a permanent magnet.

17. The magnetic scanhead of claim 15, wherein the coil is twisted around both a portion of the first pole piece and a portion of the second pole piece.

18. The magnetic scanhead of claim 15, further comprising a second coil having a conductive core and an insulating material, the second coil being twisted around at least a portion of the first pole piece, the second coil having a plurality of ends.

19. The magnetic scanhead of claim 15, wherein the first pole piece is composed of a soft magnetic material.

20. The magnetic scanhead of claim 15, wherein the first pole piece is composed of a permanent magnetic material.

21. A magnetic scanhead for sensing a flux measurement of a document being transported past the scanhead, comprising:

a first pole piece perpendicular to a transport direction of the document;

a second pole piece perpendicular to the transport direction and parallel to the first pole piece;

a middle section located between the first pole piece and the second pole piece;

a coil having a conductive core and an insulating material, the coil being twisted around at least a portion of the first pole piece, the coil having a plurality of ends;

at least one power supply wherein the plurality of ends of the coil are electrically connected to the power supply, the power supply being configured to supply an adjustable and reversible D.C. electric current to the coil;

a controller being configured to adjust the amount of current supplied to the coil during operation based on a characteristic of the document to be authenticated; and a sensor between the first pole piece and the second pole piece, the sensor being adapted to sense the flux measurement of the document being transported.

22. The magnetic scanhead of claim 21, wherein the controller is configured to receive a signal associated with the characteristic of the document to be authenticated from a sensor.

23. The magnetic scanhead of claim 22, wherein the sensor is an optical sensor configured to automatically generate the indication of the characteristic of the document to be authenticated.

24. The magnetic scanhead of claim 23, wherein the document is a currency bill and the characteristic of the document to be authenticated is a denomination.

25. The magnetic scanhead of claim 21, herein the controller is configured to receive from a manual input device an indication of the characteristic of the document to be authenticated.

26. A magnetic detection system for authenticating a document, the magnetic detection system comprising:

a first magnetic scanhead being adapted to create a first magnetic field for saturating the magnetization of an area on the document;

a second magnetic scanhead including an electromagnet, the electromagnet being configured to create a magnetic field of adjustable intensity, the second magnetic field being of opposite polarity from the first magnetic field; and a controller being adapted to automatically adjust the second magnetic field by changing the amount of current supplied to the electromagnet, wherein the controller is adapted to adjust the supplied current during operation based on a sensed characteristic of the document to be authenticated.

27. The magnetic detection system of claim 26, further comprising a sensor configured to receive an indication of the characteristic of the document to be authenticated.

28. The magnetic detection system of claim 27, wherein the sensor is an optical sensor.

29. The magnetic detection system of claim 26, further comprising a user input connected to the controller, the user input configured to receive a manually supplied indication of the characteristic of the document to be authenticated.

30. A method for determining the authenticity of currency bills, the method comprising the acts of:

creating a first magnetic field for saturating the magnetization of an area on a currency bill;

measuring the magnetic flux of the area on the bill in response to the first magnetic field;

creating a second magnetic field of opposite polarity from the first magnetic field;

adjusting the intensity of the second magnetic field based on the denomination of the bill, the second magnetic field being of opposite polarity from the first magnetic field;

measuring the magnetic flux of the area on the bill in response to the second magnetic field; and determining a flux ratio of the first magnetic flux measurement to the second magnetic flux measurement.

31. The method of claim 30, further comprising the act of automatically determining the denomination of the bill and wherein the act of adjusting is based on the automatically determined denomination of the bill.

32. The method of claim 31, wherein the act of automatically determining the denomination of the bill is performed by an optical sensor.

33. The method of claim 30, further comprising the act of manually determining the denomination of the bill, and wherein the act of adjusting is based on the manually determined denomination of the bill.

34. The method of claim 30, further comprising comparing the determined flux ratio to stored master authentication information.

35. The method of claim 34, further comprising deeming the bill authentic when the determined flux ratio is favorably compared to the stored master authentication information.

36. The method of claim 34, further comprising generating an error signal when the determined flux ratio does not favorably compare to the stored master authentication information.

37. A method for authenticating a document using a magnetic detection system, the method comprising the acts of:

configuring a first magnetic scanhead to create a first magnetic field for saturating the magnetization of an area on the document;

configuring an electromagnet of a second magnetic scanhead to create a second magnetic field of adjustable intensity, the second magnetic field being of opposite polarity from the first magnetic field;

detecting a characteristic of the document to be authenticated; and automatically adjusting the intensity of the second magnetic field by changing the amount of current supplied to the electromagnet based upon the detected characteristic of the document to be authenticated.

38. The method of claim 37, wherein the act of detecting the characteristic of the document to be authenticated includes automatically detecting the characteristic of the document to be authenticated.

39. The method of claim 37, wherein the act of detecting the characteristic of the document to be authenticated includes manually detecting the characteristic of the document to be authenticated.

* * * * *

UNITED STATES PATENT AND TRADEMARK OFFICE

CERTIFICATE OF CORRECTION

PATENT NO. : 7,591,428 B2
APPLICATION NO. : 11/238217
DATED : September 22, 2009
INVENTOR(S) : Freeman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 752 days.

Signed and Sealed this

Twenty-first Day of September, 2010

David J. Kappos

*Director of the United States Patent and Trademark Office*